(12) United States Patent
Kageura et al.

(10) Patent No.: US 11,283,073 B2
(45) Date of Patent: Mar. 22, 2022

(54) POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Jun-ichi Kageura, Niihama (JP); Yusuke Maeda, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 299 days.

(21) Appl. No.: 16/616,127

(22) PCT Filed: May 28, 2018

(86) PCT No.: PCT/JP2018/020304
§ 371 (c)(1),
(2) Date: Nov. 22, 2019

(87) PCT Pub. No.: WO2018/221442
PCT Pub. Date: Dec. 6, 2018

(65) Prior Publication Data
US 2020/0083532 A1    Mar. 12, 2020

(30) Foreign Application Priority Data

May 31, 2017  (JP) .............................. JP2017-108483
Oct. 2, 2017   (JP) .............................. JP2017-193112

(51) Int. Cl.
*H01M 4/525*  (2010.01)
*H01M 4/505*  (2010.01)
(Continued)

(52) U.S. Cl.
CPC .......... *H01M 4/525* (2013.01); *H01M 4/505* (2013.01); *H01M 10/0525* (2013.01); *H01M 2004/027* (2013.01); *H01M 2004/028* (2013.01)

(58) Field of Classification Search
CPC ....... H01M 10/0525; H01M 2004/027; H01M 2004/028; H01M 4/131; H01M 4/36; H01M 4/505; H01M 4/525
See application file for complete search history.

(56) References Cited

U.S. PATENT DOCUMENTS 6,165,642 A    12/2000  Kawakami et al.
2006/0093920 A1  5/2006  Cheon et al.
(Continued)

FOREIGN PATENT DOCUMENTS

EP    1 667 260 A1    6/2006
JP    09-082312 A     3/1997
(Continued)

OTHER PUBLICATIONS

Extended European Search Report issued in corresponding European Patent Application No. 18809653.1-1108, dated Jan. 20, 2021.
(Continued)

*Primary Examiner* — Carlos Barcena
(74) *Attorney, Agent, or Firm* — McDermott Will & Emery LLP

(57) ABSTRACT

A positive electrode active material for a lithium secondary battery includes secondary particles which are aggregates of primary particles that are capable of being doped and dedoped with lithium ions, in which the secondary particles
(Continued)

have a total specific surface area of pores having a pore radius of 10 nm or more and 50 nm or less of 0.27 m$^2$/g or more and 0.90 m$^2$/g or less in a pore distribution measured by a mercury porosimetry method.

20 Claims, 4 Drawing Sheets

(51) Int. Cl.
 *H01M 10/0525* (2010.01)
 *H01M 4/02* (2006.01)

(56) References Cited

U.S. PATENT DOCUMENTS

| | | |
|---|---|---|
| 2009/0035659 A1 | 2/2009 | Takeuchi et al. |
| 2009/0104517 A1 | 4/2009 | Yuasa et al. |
| 2009/0104530 A1 | 4/2009 | Shizuka et al. |
| 2016/0126547 A1* | 5/2016 | Koga ............ C01G 45/1242 429/224 |
| 2016/0190586 A1* | 6/2016 | Hoshina ............ C01B 25/45 429/221 |
| 2016/0372749 A1 | 12/2016 | Iida et al. |
| 2017/0062808 A1 | 3/2017 | Oishi |
| 2018/0159127 A1 | 6/2018 | Kurita et al. |

FOREIGN PATENT DOCUMENTS

| | | |
|---|---|---|
| JP | 11-135119 A | 5/1999 |
| JP | 2005-123179 A | 5/2005 |
| JP | 2005-310421 A | 11/2005 |
| JP | 2008-108692 A | 5/2008 |
| JP | 2009-224288 A | 10/2009 |
| JP | 2011-146132 A | 7/2011 |
| JP | 2014-241229 A | 12/2014 |
| JP | 2015-018678 A | 1/2015 |
| JP | 2017-045725 A | 3/2017 |
| WO | 2016/195036 A1 | 12/2016 |

OTHER PUBLICATIONS

N.N.: "Mercury Intrusion Porosimetry Theory Presented by Micromeritics Instrument Corporation", Jul. 12, 2017 (Jul. 12, 2017).

G E Amidon et al., "Tapped Density", Developing Solid Oral Dosage Forms (Second Edition), Jan. 1, 2017 (Jan. 1, 2017).

International Search Report issued in corresponding International Patent Application No. PCT/JP2018/020304, dated Jul. 17, 2018, with English translation.

* cited by examiner

POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

CROSS REFERENCE

This application is the U.S. National Phase under 35 U.S.C. § 371 of International Application No. PCT/JP2018/020304, filed on May 28, 2018, which claims the benefit of Japanese Application No. 2017-108483, filed on May 31, 2017 and Japanese Patent Application No. 2017-193112, filed on Oct. 2, 2017, the entire contents of each are hereby incorporated by reference.

TECHNICAL FIELD

The present invention relates to a positive electrode active material for a lithium secondary battery, a positive electrode for a lithium secondary battery, and a lithium secondary battery.

Priority is claimed on Japanese Patent Application No. 2017-108483 filed in Japan on May 31, 2017 and Japanese Patent Application No. 2017-193112 filed in Japan on Oct. 2, 2017, the content of which is incorporated herein by reference.

BACKGROUND ART

Lithium-containing metal composite oxides have been used as positive electrode active materials for lithium secondary batteries. Lithium secondary batteries have already been put into practical use not only for small power sources for mobile phones and notebook computers, but also for medium and large power sources for automobiles and power storage.

In order to further expand the applications of lithium secondary batteries, lithium secondary batteries with higher capacity and excellent output characteristics are required.

For the purpose of improving charge/discharge efficiency in addition to a high capacity, for example, Patent Document 1 describes a positive electrode active material for a lithium secondary battery having a pore radius of not more than 50 nanometers.

Patent Document 2 describes a technique that focuses on the pores of the positive electrode active material. Patent Document 2 aims to provide a positive electrode active material in which is specified the proportion of pores having a diameter of not more than 1 μm and exhibits good battery characteristics even in a low-temperature environment.

CITATION LIST

Patent Literature

Patent Document 1: Japanese Unexamined Patent Application, First Publication No. H9-82312
Patent Document 2: Japanese Unexamined Patent Application, First Publication No. 2005-310421

DISCLOSURE OF INVENTION

Problem to be Solved by Invention

However, in order to further improve the output characteristics of the lithium secondary battery, the positive electrode active materials obtained by the methods described in Patent Documents 1 and 2 can be further improved from the viewpoint of durability when used as a lithium secondary battery, particularly when it is charged for a long time in a high temperature environment.

The present invention has been made in view of such circumstances, and an object is to provide a positive electrode active material for a lithium secondary battery with improved durability at high temperature and long-time charging when used as a lithium secondary battery, a positive electrode, and a lithium secondary battery which use the positive electrode active material.

Solution to Problem

The present invention includes the following [1] to [8].

[1] A positive electrode active material for a lithium secondary battery including secondary particles which are aggregates of primary particles that are capable of being doped and dedoped with lithium ions, in which the secondary particles have a total specific surface area of pores having a pore radius of 10 nm or more and 50 nm or less of 0.27 m$^2$/g or more and 0.90 m$^2$/g or less in the pore distribution measured by a mercury porosimetry method.

[2] The positive electrode active material for a lithium secondary battery according to [1], in which the secondary particles are composed of a lithium-containing metal composite oxide whose compositional formula is represented by the following formula (I).

$$\text{Li}[\text{Li}_x(\text{Ni}_{(1-y-z-w)}\text{Co}_y\text{Mn}_z\text{M}_w)_{1-x}]\text{O}_2 \qquad (\text{I})$$

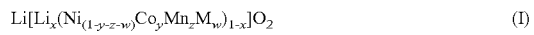

(in the formula (I), −0.1≤x≤0.2, 0<y≤0.4, 0≤z≤0.4, 0≤w≤0.1, M is one or more metals selected from the group consisting of Mg, Ca, Sr, Ba, Zn, B, Al, Ga, Ti, Zr, Ge. Fe, Cu, Cr, V, W, Mo, Sc, Y. Nb, La, Ta, Tc, Ru, Rh, Pd, Ag, Cd, In, and Sn.)

[3] The positive electrode active material for a lithium secondary battery according to [1] or [2], in which a content of lithium carbonate contained in a residual alkali salt on a surface of the secondary particles measured by neutralization titration is 0.3% by mass or less with respect to the total mass of the secondary particles, and a content of lithium hydroxide contained in the residual alkali salt on the surface of the secondary particles measured by neutralization titration is 0.3% by mass or less with respect to the total mass of the secondary particles.

[4] The positive electrode active material for a lithium secondary battery according to any one of [1] to [3], in which a tap density is 2.3 g/cc or more.

[5] The positive electrode active material for lithium secondary battery according to any one of [1] to [4], in which an average secondary particle diameter is 5 μm or more and 20 μm or less.

[6] The positive electrode active material for a lithium secondary battery according to any one of [1] to [5], in which, in the pore distribution measured by mercury porosimetry method, a pore specific volume of pores having a pore radius of 50 nm or more and 200 nm or less is 0.005 cm$^3$/g or less.

[7] A positive electrode for a lithium secondary battery including the positive electrode active material for a lithium secondary battery according to any one of [1] to [6].

[8] A lithium secondary battery including the positive electrode for a lithium secondary battery according to [7].

Advantageous Effects of Invention

According to the present invention, when used as a lithium secondary battery, the positive electrode active material for a lithium secondary battery with improved durability at high temperature and long-term charge, the positive electrode using the positive electrode active material for a lithium secondary battery, and the lithium secondary battery can be provided.

DESCRIPTION OF EMBODIMENTS

Figure 1A:
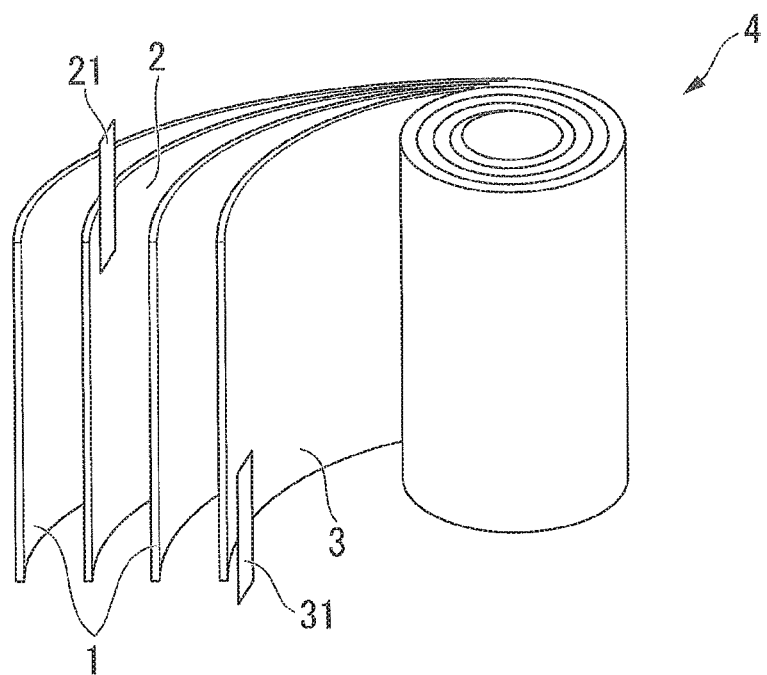
FIG. 1A is a schematic configuration view illustrating an example of a lithium-ion secondary battery.

<Positive Electrode Active Material for Lithium Secondary Battery>

The positive electrode active material for a lithium secondary battery of the present embodiment includes secondary particles which are aggregates of primary particles that are capable of being doped and dedoped with lithium ions.

By satisfying the following specific conditions, the positive electrode active material for a lithium secondary battery of the present embodiment can realize durability at high temperature and long-time charge when used as a lithium secondary battery.

[Conditions]

The secondary particles have a total specific surface area of pores having a pore radius of 10 nm or more and 50 nm or less of 0.27 m²/g or more and 0.90 m²/g or less in the pore distribution measured by the mercury porosimetry method.

From the viewpoint of further enhancing the effect of the present invention, the upper limit of the total pore specific surface area is preferably 0.80 m²/g or less, more preferably 0.75 m²/g or less, and particularly preferably 0.70 m²/g or less.

The lower limit of the total pore specific surface area is preferably 0.29 m²/g or more, more preferably 0.31 m²/g or more, and particularly preferably 0.32 m²/g or more. The upper limit value and lower limit value of the pore specific surface area can be arbitrarily combined. For example, the pore specific surface area is preferably 0.29 m²/g or more and 0.80 m²/g or less, more preferably 0.31 m²/g or more and 0.75 m²/g or less, and particularly preferably 0.32 m²/g or more and 0.70 m²/g or less.

In the present embodiment, the total pore specific surface area of the positive electrode active material for a lithium secondary battery can be obtained by the following method.

First, after evacuating the container containing the sample, the container is filled with mercury. Mercury has a high surface tension, and as it is, mercury does not enter the pores on the surface of the sample. However, while pressure is applied to the mercury and the pressure is gradually increased, mercury gradually enters the pores in the order of the larger pores to the smaller pores. If the amount of mercury intrusion into the pores is detected while continuously increasing the pressure, a mercury intrusion curve can be obtained from the relationship between the pressure applied to mercury and the amount of mercury intrusion. Here, assuming that the shape of the pore is cylindrical, the pressure applied to mercury is P, the pore diameter (pore diameter) is D, the surface tension of mercury is a, and the contact angle between mercury and the sample is θ, then the pore diameter is represented by the following formula (A).

$$D = -4\sigma \times \cos\theta / P \tag{A}$$

Since σ and θ are constants, the relationship between the applied pressure P and the pore diameter D is obtained from the formula (A), and the pore specific surface area can be derived by measuring the mercury intrusion volume at that time.

That is, since there is a correlation between the pressure P applied to mercury and the diameter D of the pore into which mercury enters, the pore distribution curve representing the relationship between the size of the pore radius of the sample and the volume thereof is obtained based on the obtained mercury intrusion curve. In addition, as for the approximate measurement limit of the pore diameter by the mercury porosimetry method, the lower limit is about 2 nm and the upper limit is about 200 μm.

The measurement by the mercury porosimetry method can be performed using an apparatus such as a mercury porosimeter. Specific examples of the mercury porosimeter include Autopore III9420 (manufactured by Micromeritics Instruments Corporation). The measurement conditions are a measurement pressure of 1.07 psia to 59256.3 psia (7.37 kPaA to 408.569 MPaA), a mercury surface tension of 480 dynes/cm, and a contact angle of mercury and the sample of 140° at a measurement temperature of 25° C.

The total value of the pore specific surface areas obtained by the above method is calculated.

The positive electrode active material for a lithium secondary battery according to the present embodiment that satisfies the above conditions is a high-density secondary particle and has fine pores inside the secondary particle.

In the present specification, the term "high-density secondary particles" means that there are few pores. For example, secondary particles having a tap density of 1.6 g/cc or more which will be described later are shown. As another example, the state where the secondary particles include pores in which the pore specific volume is small when the pore radius is in the range of 50 nm or more and 200 nm or less and a peak in the range of the pore radius of 10 nm or more and 50 nm or less exists in the pore distribution measured by mercury porosimetry method is shown. In the positive electrode active material for a lithium secondary battery according to the present embodiment, a state in which fine pores are not observed when a cross section of the secondary particles is observed with SEM is not included.

Figure 5:
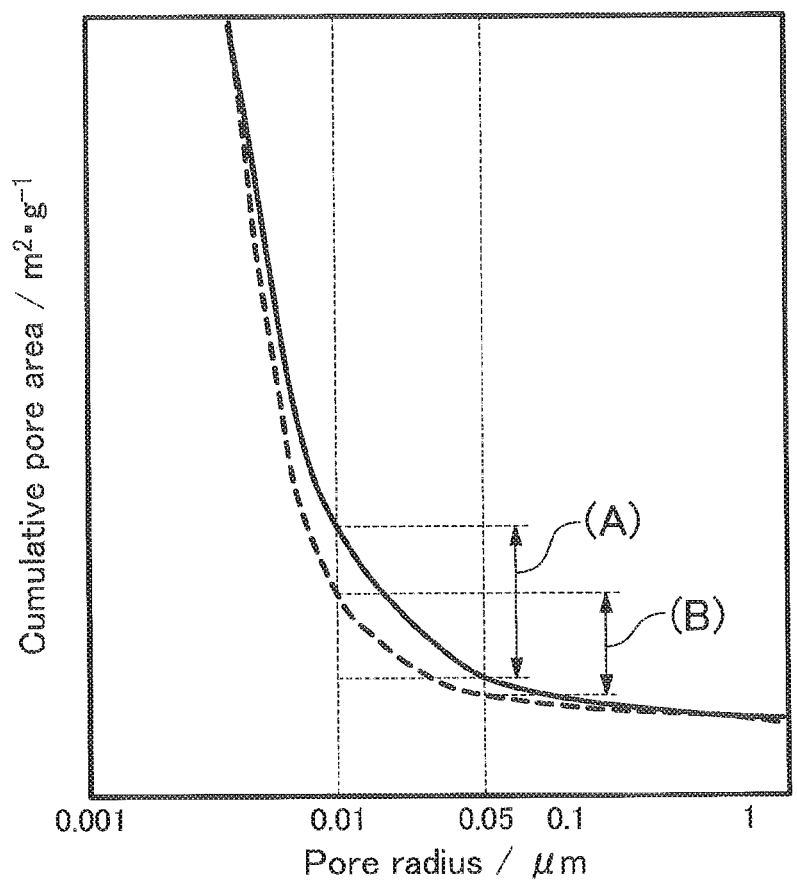
FIG. 5 is a schematic diagram which shows the relationship between the pore radius (μm) of the secondary particles in the positive electrode active material for a lithium secondary battery of the present invention or the completely dense secondary particles without fine voids and the cumulative pore specific surface area (m²/g).

FIG. 5 shows a schematic diagram which shows the relationship between the pore radius (μm) of the secondary particles in the positive electrode active material for a lithium secondary battery of the present invention or the completely dense secondary particles without fine voids which is secondary particles other than the present invention and the cumulative pore specific surface area (m²/g).

In FIG. 5, the vertical axis "Cumulative pore area/m²·g⁻¹" is "cumulative pore specific surface area (m²/g)", and the horizontal axis "Pore radius/μm" is "pore radius (μm)".

In FIG. 5, the curve indicated by the solid line is a schematic curve when the secondary particles in the positive electrode active material for a lithium secondary battery of the present invention are measured. In FIG. 5, the curve indicated by the broken line is a schematic curve when the completely fine secondary particles without fine voids which are the secondary particles other than the present invention are measured.

In the curve shown by the solid line in FIG. 5, the total specific surface areas of pores (value of symbol (A) in FIG. 5) in the range of 0.01 μm or more and 0.05 μm or less (that is, the range of 10 nm or more and 50 nm or less) is 0.27 m²/g or more and 0.90 m²/g or less.

On the other hand, in the case of completely dense secondary particles without fine voids, the total specific surface areas of pores (value of symbol (B) in FIG. 5) in the range of 0.01 μm or more and 0.05 μm or less (that is, the range of 10 nm or more and 50 nm or less) does not become 0.27 m²/g or more and 0.90 m²/g or less as shown by the broken line in FIG. 5.

As described above, by measuring the pore radius (μm) and the total specific surface area of the pores (m²/g), it can be determined whether or not it is the high-density secondary particle of the present invention.

The positive electrode active material for a lithium secondary battery of the present embodiment has fine pores that satisfy the above conditions. When the charged state is maintained and the positive electrode active material particles expand, the pores bring a buffering action, so that the generation of cracks can be suppressed. Generation of a new surface due to cracks can be suppressed, and a reaction with the electrolytic solution at the secondary particle interface can be suppressed.

For this reason, according to the present embodiment, a float electric quantity observed when an irreversible reaction with the electrolytic solution occurs at the secondary particle interface can be reduced. That is, according to the positive electrode active material for a lithium secondary battery of the present embodiment, it is possible to provide a lithium secondary battery that is excellent in float characteristics and excellent in durability at high temperature and long-time charging.

On the other hand, when the inside of the secondary particles of the positive electrode active material for lithium secondary batteries has almost no fine pores (in other words, the total specific surface area of pores having a pore radius of 10 nm or more and 50 nm or less is less than 0.27 m²/g), a new surface generated by cracking due to expansion of the positive electrode active material particles while maintaining the charged state becomes a reaction site with the electrolytic solution. It is assumed that this causes an irreversible reaction and increases the float electric quantity.

In addition, when there are many fine pores inside the secondary particles (in other words, the total specific surface area of pores having a pore radius of 10 nm or more and 50 nm or less is larger than 0.90 m²/g), the amount of impurities on the surface of the positive electrode active material (for example, residual alkali salt) increases, which can be a starting point for irreversible reactions.

<<Composition>>

The secondary particles included in the positive electrode active material for a lithium secondary battery according to the present embodiment preferably includes a lithium-containing metal composite oxide whose compositional formula is represented by the following formula (I).

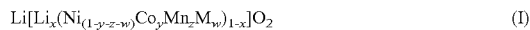

$$Li[Li_x(Ni_{1-y-z-w}Co_yMn_zM_w)_{1-x}]O_2 \quad (I)$$

(in the formula (I), $-0.1 \leq x \leq 0.2$, $0 < y \leq 0.4$, $0 \leq z \leq 0.4$, $0 \leq w \leq 0.1$, M is one or more metals selected from the group consisting of Mg, Ca, Sr, Ba, Zn. B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

From the viewpoint of obtaining a lithium secondary battery having high cycle characteristics, x in the formula (I) is preferably −0.1 or more, more preferably more than 0, and further preferably 0.02 or more. Further, from the viewpoint of obtaining a lithium secondary battery with higher initial Coulomb efficiency, x in the formula (I) is preferably 0.2 or less, more preferably 0.08 or less, and further preferably 0.06 or less.

The upper limit value and the lower limit value of x can be arbitrarily combined. For example, x is preferably −0.1 or more and 0.2 or less, more preferably more than 0 and 0.08 or less, and further preferably 0.02 or more and 0.06 or less.

Further, from the viewpoint of obtaining a lithium secondary battery having low battery resistance, y in the formula (I) is preferably more than 0, more preferably 0.01 or more, and further preferably 0.05 or more. Y in the formula (I) is preferably 0.4 or less, more preferably 0.35 or less, and further preferably 0.33 or less.

The upper limit value and the lower limit value of y can be arbitrarily combined. For example, y is preferably more than 0 and 0.4 or less, more preferably 0.01 or more and 0.35 or less, and further preferably 0.05 or more and 0.33 or less.

Further, from the viewpoint of obtaining a lithium secondary battery having high cycle characteristics, z in the formula (I) is preferably 0 or more, and more preferably 0.03 or more. Further, from the viewpoint of obtaining a lithium secondary battery having high storage characteristics at a high temperature (for example, in an environment of 60° C.), z in the formula (I) is preferably 0.4 or less, more preferably 0.38 or less, and further preferably 0.35 or less.

The upper limit value and lower limit value of z can be arbitrarily combined. For example, z is preferably 0 or more and 0.4 or less, more preferably 0.03 or more and 0.38 or less, and further preferably 0.03 or more and 0.35 or less.

Further, from the viewpoint of obtaining a lithium secondary battery having low battery resistance, w in the formula (I) is preferably more than 0, more preferably 0.0005 or more, and further preferably 0.001 or more. Further, w in the formula (I) is preferably 0.1 or less, more preferably 0.08 or less, and further preferably 0.07 or less.

The upper limit value and the lower limit value of w can be arbitrarily combined. For example, w is preferably more than 0 and 0.1 or less, more preferably 0.0005 or more and 0.08 or less, and further preferably 0.001 or more and 0.07 or less.

M in the formula (I) represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

Further, from the viewpoint of obtaining a lithium secondary battery having high cycle characteristics, M in the formula (I) is preferably one or more metals selected from the group consisting of Ti, Mg, Al, W. B, and Zr, and preferably one or more metals selected from the group consisting of Al, W, B, and Zr.

<<Amount of Residual Lithium>>

In the present embodiment, a content of lithium carbonate contained in a residual alkali salt on the surface of the secondary particles measured by neutralization titration is preferably 0.3% by mass or less with respect to the total mass of the secondary particles, and a content of lithium hydroxide contained in the residual alkali on the surface of the secondary particles measured by neutralization titration is preferably 0.3% by mass or less with respect to the total mass of the secondary particles.

From the viewpoint of further improving the cycle characteristics, the content of lithium carbonate contained in the residual alkali salt on the surface of the secondary particles measured by neutralization titration is more preferably 0.20% by mass or less and particularly preferably 0.15% by mass or less with respect to the total mass of the secondary particles.

The lower limit of the content of lithium carbonate with respect to the total mass of the secondary particles is not particularly limited, and examples thereof include 0.01% by mass, 0.02% by mass, and 0.03% by mass.

Further, the content of lithium hydroxide contained in the residual alkali salt on the surface of the secondary particles measured by neutralization titration is more preferably 0.25% by mass or less and particularly preferably 0.20% by mass or less with respect to the total mass of the secondary particles.

The lower limit of the content of lithium hydroxide is not particularly limited, and examples thereof include 0.01% by mass, 0.02% by mass, and 0.03% by mass.

The upper limit value and the lower limit value of the content of lithium carbonate or the lithium hydroxide content can be arbitrarily combined. For example, the content of lithium carbonate contained in the residual alkali salt on the surface of the secondary particles measured by neutralization titration is 0.01% by mass or more and 0.3% by mass or less, more preferably 0.02% by mass or more and 0.20% by mass or less, and particularly preferably 0.03% by mass or more and 0.15% by mass or less with respect to the total mass of the secondary particles. The content of lithium hydroxide contained in the residual alkali salt on the surface of the secondary particles measured by neutralization titration is 0.01% by mass or more and 0.3% by mass or less, more preferably 0.02% by mass or more and 0.20% by mass or less, and particularly preferably 0.03% by mass or more and 0.15% by mass or less with respect to the total mass of the secondary particles.

<<Tap Density>>

A tap density of the positive electrode active material for a lithium secondary battery of the present embodiment is preferably 2.1 g/cc or more, more preferably 2.3 g/cc or more, further preferably 2.5 g/cc or more, particularly preferably 2.6 g/cc or more.

Although the upper limit of the tap density is not specifically limited, for example, the tap density is 3.5 g/cc or less.

As the tap density, a value obtained by the method described in JIS R 1628-1997 is used. Specifically, the positive electrode active material for a lithium secondary battery, which is a measurement sample, is dropped into a 20 cm$^3$ measurement container while passing through a sieve, and the container is filled with the measurement sample. The sample volume is read and calculated after covering with a lid and repeating tapping 200 times with a stroke length of 50 mm.

<<Average Secondary Particle Diameter>>

In the present embodiment, the average secondary particle diameter of the positive electrode active material for a lithium secondary battery is preferably 5 µm or more, more preferably 5.5 µm or more, and particularly preferably 6.0 µm or more. The upper limit is more preferably 20 µm, more preferably 18 µm, and particularly preferably 15 µm.

The upper limit value and the lower limit value of the average particle diameter can be arbitrarily combined. For example, the average secondary particle size of the positive electrode active material for a lithium secondary battery is preferably 5 µm or more and 20 µm or less, more preferably 5.5 µm or more and 15 µm or less, and particularly preferably 6.0 µm or more and 18 µm or less.

In the present invention, the "average secondary particle diameter" of the positive electrode active material for a lithium secondary battery refers to a value measured by the following method (laser diffraction scattering method).

Using a laser diffraction particle size distribution meter (manufactured by HORIBA, Ltd., model number: LA-950), 0.1 g of a positive electrode active material for a lithium secondary battery is put into 50 ml of a 0.2 mass % aqueous solution of sodium hexametaphosphate to obtain a dispersion liquid in which the powder is dispersed. The particle size distribution of the obtained dispersion liquid is measured to obtain a volume-based cumulative particle size distribution curve. In the obtained cumulative particle size distribution curve, the value of the particle diameter ($D_{50}$) viewed from the fine particle side at the time of 50% accumulation is defined as the average secondary particle diameter of the positive electrode active material for the lithium secondary battery.

<<Pore Specific Volume>>

The positive electrode active material for a lithium secondary battery of the present embodiment has a pore specific volume in the range of 50 nm or more and 200 nm or less in a pore distribution measured by a mercury porosimetry method of preferably 0.005 cm$^3$/g or less, more preferably 0.004 cm$^3$/g or less, and particularly preferably 0.003 cm$^3$/g or less. When the pore specific volume is 0.005 cm$^3$/g or less, the paste viscosity is stable over time in the production of a paste for a positive electrode mixture described later.

<Method for Producing Positive Electrode Active Material for Lithium Secondary Battery>

In producing the positive electrode active material for lithium secondary battery of the present invention, it is preferable that, first, a metal composite compound containing a metal other than lithium, that is, an essential metal composed of Ni and Co, and an arbitrary metal of any one or more metals selected from Mg, Ca, Sr. Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn is prepared, and the metal composite compound is calcined with an appropriate lithium salt. The arbitrary metal is a metal optionally contained in the metal composite compound as desired, and the arbitrary metal may not be contained in the metal composite compound. As a metal complex compound, a metal complex hydroxide or a metal complex oxide is preferable. Hereinafter, an example of a production method of a lithium-containing metal composite compound will be described by separately describing a step of producing the metal composite compound and a step of producing the lithium-containing metal composite oxide.

(Manufacturing Process of Metal Composite Compound)

The metal composite compound can be produced by a generally known batch coprecipitation method or continuous coprecipitation method. Hereinafter, the production method will be described in detail, as an example, taking a metal composite hydroxide containing nickel, cobalt, manganese, and aluminum as a metal.

First, by a coprecipitation method, particularly a continuous method described in Japanese Unexamined Patent Application, First Publication No. 2002-201028, a nickel salt solution, a cobalt salt solution, a manganese salt solution, an aluminum salt solution, and a complexing agent are reacted, whereby a metal composite hydroxide represented by $Ni_{(1-y-z-w)}Co_yMn_zAl_w(OH)_2$ (where $0<y\leq0.4$, $0\leq z\leq0.4$, $0\leq w\leq0.1$) is produced.

A nickel salt as a solute of the nickel salt solution is not particularly limited, and for example, any of nickel sulfate, nickel nitrate, nickel chloride, and nickel acetate can be used. As a cobalt salt which is a solute of the cobalt salt solution, for example, any of cobalt sulfate, cobalt nitrate, cobalt chloride, and cobalt acetate can be used. As a manganese salt which is a solute of the manganese salt solution, for example, any of manganese sulfate, manganese nitrate, manganese chloride, and manganese acetate can be used. As an aluminum salt which is a solute of the aluminum salt solution, for example, aluminum sulfate can be used. The above metal salts are used at a ratio corresponding to the composition ratio of the $Ni_{(1-y-z-w)}Co_yMn_zAl_w(OH)_2$. That is, the amount of each of the metal salts is defined so that the molar ratio of nickel, cobalt, manganese, and aluminum in the mixed solution containing the above metal salts corresponds to (1−y−z−w):y:z:w. Also, water is used as a solvent.

The complexing agent is capable of forming a complex with ions of nickel, cobalt, manganese, and aluminum in an aqueous solution, and examples thereof include ammonium ion donors (ammonium hydroxide, ammonium sulfate, ammonium chloride, ammonium carbonate, ammonium fluoride, and the like), hydrazine, ethylenediaminetetraacetic acid, nitrilotriacetic acid, uracildiacetic acid, and glycine.

During the precipitation, an alkali metal hydroxide (for example, sodium hydroxide, or potassium hydroxide) is added, if necessary, in order to adjust the pH value of the aqueous solution.

Further, it is preferable to introduce an inert gas into the reaction tank. Under the introduction of an inert gas, aggregation due to oxidation of the transition metal element in the reaction tank is suppressed, and a uniform metal composite hydroxide can be obtained.

When manganese is contained as the transition metal, it is preferable that the inside of the reaction tank is in an oxygen-containing atmosphere in an appropriate level or in the presence of an oxidizing agent while maintaining an inert atmosphere. This is because the form of the metal composite hydroxide can be easily controlled by appropriately oxidizing the transition metal. By controlling the state of the metal composite hydroxide, the pore specific volume and the total value of the pore specific surface area can be easily adjusted within the range of the present invention. The oxygen in the oxygen-containing gas or the oxidizing agent needs to include sufficient oxygen atoms to oxidize the transition metal. Unless a large amount of oxygen atoms is introduced, an inert atmosphere in the reaction tank can be maintained.

In order to make the reaction tank have an oxygen-containing atmosphere, an oxygen-containing gas may be introduced into the reaction tank.

In order to improve the uniformity of the solution in the reaction tank, it is more preferable to bubble the oxygen-containing gas. Examples of the oxygen-containing gas include oxygen gas, air, or a mixed gas of air or oxygen gas and oxygen-free gas such as nitrogen gas. From the viewpoint of easy adjustment of the oxygen concentration in the reaction tank, the mixed gas is preferable among the above. For example, nitrogen and air are continuously flowed in the reaction tank so that the ratio of the oxygen concentration in the reaction tank (volume %) with respect to the manganese solution flow rate (mol/hr.) in the mixed raw material solution in the tank is 1.3 (%·hr./mol) or less.

Here, it can be said that the manganese solution flow rate is a dropping rate of manganese dropped into the reaction tank. "Oxygen concentration in the reaction tank" means the oxygen concentration in the gas phase in the reaction tank.

By controlling the oxygen concentration in the tank with respect to the manganese solution flow rate, it is possible to control the crystal growth of the metal composite hydroxide due to appropriately oxidizing the transition metal element, and the pore specific volume and the total value of the pore specific surface area can be easily adjusted within the range of the present invention.

An oxidizing agent may be added to the reaction tank such that the oxidizing agent exists inside of the reaction tank. Examples of the oxidizing agent include hydrogen peroxide, chlorate, hypochlorite, perchlorate, and permanganate. Hydrogen peroxide is preferably used from the viewpoint of hardly bringing impurities into the reaction system.

When the nickel salt solution, cobalt salt solution, manganese salt solution, aluminum salt solution, and a complexing agent are continuously supplied to the reaction tank, nickel, cobalt, manganese, and aluminum react to produce nickel cobalt manganese aluminum hydroxide. In order to make the pore specific volume and the total value of the pore specific surface area within the range of the present invention, the temperature of the reaction tank is controlled within a range of, for example, 20° C. or more and 80° C. or less and preferably 30° C. or more and 70° C. or less. Moreover, in order to make the above [Condition] and the above specific pore volume within the range of the present invention, the pH value in the reaction tank is controlled within the range of, for example, pH 9 or more and pH 13 or less, preferably pH 11 or more and pH 13 or less. By setting these conditions, the substance in the reaction tank is appropriately stirred. The reaction tank is of a type that causes the formed reaction precipitate to overflow for separation.

In this specification, the pH value is a value when measured at 40° C. Thus, even if the pH value measured at different temperatures is outside the range described herein but the pH value when measured at 40° C. is within the range described herein, it is understood that the pH value is within the scope of the present invention.

By appropriately controlling the concentration of metal salt to be supplied to the reaction tank, the stirring speed, the reaction temperature, the reaction pH, the calcining conditions described later, and the like, various physical properties of the lithium-containing metal composite oxide finally obtained such as a total value of the pore specific surface area, a tap density, an average secondary particle diameter, and a pore specific volume can be controlled.

Since the reaction conditions depend on the size of the reaction tank to be used, the reaction conditions may be optimized while monitoring various physical properties of the finally obtained lithium-containing metal composite oxide.

After the above reaction, the obtained reaction precipitate is washed with water and then dried to isolate nickel cobalt manganese aluminum composite hydroxide as a nickel cobalt manganese aluminum composite compound. Moreover, as necessary, the nickel cobalt manganese aluminum composite hydroxide may be washed with a weak acid water or an alkaline solution containing sodium hydroxide or potassium hydroxide.

In the above example, nickel cobalt manganese aluminum composite hydroxide is manufactured, but nickel cobalt manganese aluminum composite oxide may be prepared. When the nickel cobalt manganese aluminum composite oxide is prepared, for example, a step of bringing the coprecipitate slurry into contact with an oxidizing agent or a step of heat treating the nickel cobalt manganese aluminum composite hydroxide may be performed.

(Step of Producing Lithium-containing Metal Composite Oxide)

The metal composite oxide or hydroxide is dried and thereafter mixed with a lithium salt. The drying condition is not particularly limited, and for example, may be any of a condition under which a metal composite oxide or hydroxide is not oxidized and reduced (that is, a condition under which an oxide remains as an oxide and a hydroxide remains as a hydroxide), a condition under which a metal composite hydroxide is oxidized (that is, a condition under which a hydroxide is oxidized to an oxide), and a condition under which a metal composite oxide is reduced (that is, a condition under which an oxide is reduced to a hydroxide). For a condition under which no oxidation and no reduction occurs, an inert gas such as nitrogen, helium, or argon may be used. In the conditions under which the hydroxide is oxidized, oxygen or air may be used. In addition, as a condition under which a metal composite oxide is reduced, a reducing agent such as hydrazine or sodium sulfite may be used in an inert gas atmosphere. As the lithium salt, any one of lithium carbonate, lithium nitrate, lithium acetate, lithium hydroxide, lithium hydroxide hydrate, lithium oxide, or a mixture of two or more thereof can be used.

After drying the metal composite oxide or hydroxide, classification may be appropriately performed thereon. The lithium salt described above and the metal composite oxide or hydroxide are preferably mixed such that the molar ratio (Li/Me) between lithium and the metal element in the metal composite oxide or hydroxide exceeds 1. A lithium-nickel cobalt manganese aluminum composite oxide is obtained by calcining a mixture of the nickel cobalt manganese aluminum composite hydroxide and the lithium salt.

For calcining, dry air, an oxygen atmosphere, inert atmosphere, and the like are used depending on the desired composition, and a plurality of heating steps are performed as necessary. In order to make the pore specific volume and the total value of the pore specific surface area within the specific range of the present invention, it is preferable to perform calcining in an oxygen atmosphere.

The calcining temperature of the metal composite oxide or hydroxide and a lithium salt such as lithium hydroxide and lithium carbonate is not particularly limited, but it is preferably 600° C. or higher and 1000° C. or lower, more preferably 680° C. or higher and 950° C. or lower, and further preferably 700° C. or higher and 900° C. or lower in order to make the pore specific volume and the total value of the pore specific surface area within the specific range of the present invention. When the calcining temperature is equal to or higher than the lower limit, a positive electrode active material for a lithium secondary battery having a strong crystal structure can be obtained. Moreover, when the calcining temperature is not more than the above upper limit value, volatilization of lithium on the surface of the secondary particles can be reduced.

The calcining time from the start of the temperature rise to the end of temperature holding after the temperature is reached the calcining temperature is preferably 3 hours or more and 50 hours or less. When the calcining time exceeds 50 hours, the battery performance tends to be substantially inferior due to volatilization of lithium. That is, when the calcining time is 50 hours or less, lithium volatilization hardly occurs and the battery performance is not easily lowered. If the calcining time is less than 3 hours, the crystal growth is poor and the battery performance tends to be poor. That is, when the calcining time is 3 hours or more, the crystal development is good and the battery performance tends to be good. In addition, it is also effective to perform temporary calcining before the above calcining. The temporary calcination temperature is preferably in the range of 300° C. to 850° C. for 1 to 10 hours.

It is preferable that the time until the baking temperature is reached after the start of temperature increase is 0.5 hours or longer and 20 hours or shorter. In a case where the time until the calcining temperature is reached after the start of temperature increase is in this range, a more uniform lithium-containing metal composite oxide can be obtained. In addition, it is preferable that the time until the temperature holding finishes after the calcining temperature is reached is 0.5 hours or longer and 20 hours or shorter. In a case where the time until the temperature holding finishes after the calcining temperature is reached is in this range, the crystal growth preferably proceeds, and the cell performance can be further improved.

The lithium-containing metal composite oxide obtained by calcining is appropriately classified after pulverization, and used as a positive electrode active material applicable to a lithium secondary battery. The pulverization of the lithium-containing metal composite oxide is preferably pulverization at a strength that does not crush the secondary particles themselves while pulverizing the aggregation of the secondary particles.

[Method for Producing Positive Electrode Active Material for Lithium Secondary Battery Including Coating Particles or Coating Layer]

When producing a positive electrode active material for lithium secondary battery including coating particles or a coating layer, first, a coating raw material and a lithium-containing metal composite oxide are mixed. Next, by performing heat treatment as necessary, coating particles or a coating layer made of a lithium-containing metal composite oxide can be formed on the surfaces of the primary particles or secondary particles of the lithium-containing metal composite oxide.

The coating raw material is made of oxide, hydroxide, carbonate, nitrate, sulfate, halide, oxalate or alkoxide containing one or more elements selected from B, Al, Ti, Zr, La and W and is preferably oxide.

In order to more efficiently coat the surface of the lithium-containing metal composite oxide with the coating raw material, the coating raw material is preferably finer than the secondary particles of the lithium-containing metal composite oxide. Specifically, the average secondary particle diameter of the coating raw material is preferably 1 μm or less, and more preferably 0.1 μm or less. The lower limit of the average secondary particle diameter of the covering material is not particularly limited, but is actually about 10 nm. The average secondary particle diameter of the coating raw material can be measured by the same measurement method as that for the 50% cumulative diameter $D_{50}$ of the secondary particle diameter of the lithium composite metal compound.

The ratio of the coating raw material when mixing the coating raw material and the lithium-containing metal composite oxide is preferably 0.01 to 10% by mass and more preferably 0.1 to 5% by mass with respect to the total mass of the coating raw material and the lithium-containing metal composite oxide.

Mixing of the coating raw material and the lithium-containing metal composite oxide may be performed in the same manner as mixing when manufacturing the positive electrode active material for the lithium secondary battery. A method of mixing using a mixing apparatus that does not include mixing media such as balls and does not involve strong pulverization, such as a method of mixing using a powder mixer equipped with a stirring blade inside, is preferable. Moreover, the coating layer can be more firmly attached to the surface of the lithium-containing metal composite oxide by maintaining in the atmosphere containing water after mixing.

The heat treatment conditions (temperature and holding time) in the heat treatment performed as necessary after mixing the coating raw material and the lithium-containing metal composite oxide may differ depending on the type of the coating raw material. The heat treatment temperature is preferably set in a range of 300° C. or higher and 850° C. or lower, and is preferably a temperature equal to or lower than the calcining temperature of the lithium-containing metal composite oxide. When the temperature is higher than the calcining temperature of the lithium-containing metal composite oxide, the coating raw material may be dissolved in the lithium-containing metal composite oxide, and the coating layer may not be formed. The holding time in the heat treatment is preferably set shorter than the holding time at the time of calcining. As an atmosphere in the heat treatment, an atmosphere gas similar to that in the above-described calcining is an exemplary example.

By using a technique such as sputtering, CVD, or vapor deposition, a positive electrode active material for a lithium secondary battery can be obtained by forming the coating layer on the surface of the lithium-containing metal composite oxide.

Moreover, the positive electrode active material for a lithium secondary battery may be obtained by mixing and calcining the metal complex oxide or hydroxide, lithium salt, and a coating raw material.

The positive electrode active material for a lithium secondary battery provided with the coating particles or coating layer on the surface of the primary particles or secondary particles of the lithium-containing metal composite oxide is appropriately pulverized and classified, and the positive electrode active material for a lithium secondary battery is made.

(Washing Step)

After calcining, the obtained calcined product may be washed. By washing, an impurity present on the surfaces of the primary particles or secondary particles of the lithium-containing metal composite oxide and the grain boundaries between the primary particles can be removed.

Moreover, it becomes easy to adjust the pore specific volume and the total value of the pore specific surface area within the range of this invention by removing the impurity by washing. For washing, pure water or an alkaline washing solution can be used.

Examples of the alkaline washing liquid include aqueous solution of one or more anhydrides and hydrates selected from the group consisting of LiOH (lithium hydroxide), NaOH (sodium hydroxide), KOH (potassium hydroxide), $Li_2CO_3$ (lithium carbonate), $Na_2CO$ (sodium carbonate), $K_2CO_3$ (potassium carbonate), and $(NH_4)_2CO_3$. Moreover, ammonia can also be used as an alkali component.

In the washing step, as for a method of contacting the washing liquid and the lithium-containing metal composite oxide, a method of adding the lithium-containing metal composite oxide into the aqueous solution of each washing liquid and stirring, a method of showering the aqueous solution of each washing liquid as shower water to the lithium-containing metal composite oxide; and a method of adding the lithium-containing metal composite oxide into the aqueous solution of each washing liquid and stirring, then separating the lithium-containing metal composite oxide from the aqueous solution of each washing liquid, and showering the aqueous solution of each washing liquid as shower water to the separated lithium-containing metal composite oxide can be given.

In the present embodiment, the "impurity" refers to sulfur-containing ions (residual sulfate radicals) such as $SO_4^{2-}$ remaining on the surface of particles included in the lithium-containing metal composite oxide after the calcining step, residual lithium carbonate, residual lithium hydroxide, and those in which a coprecipitation residue of alkali metal used for pH control remains.

When sulfate is used as the transition metal, sulfate radicals resulting from this may remain. In the present embodiment, the source of the residual sulfate radical as an impurity is not particularly limited. For example, even when a sulfate is not used, a sulfur-containing compound remaining on the particle surface due to various materials to be used is also included in an impurity.

Furthermore, as the lithium carbonate as an impurity, when lithium carbonate is used as a lithium source (lithium salt), residual lithium carbonate resulting from this can be mentioned. In addition, even when a lithium source other than lithium carbonate is used, lithium carbonate that can be generated by the reaction of the lithium-containing metal composite oxide and carbon dioxide in the air is also included in the "impurity".

(Heat Treatment Step)

After the washing step, the washed matter is separated from the washing liquid by filtration or the like. Thereafter, heat treatment can be performed at a temperature of 50° C. to 900° C. to remove moisture. Examples of the atmosphere during the heat treatment step include an oxygen atmosphere, an inert atmosphere, a reduced pressure atmosphere, and a vacuum atmosphere. By performing the heat treatment after washing in the above atmosphere, the reaction between the lithium-containing metal composite oxide and the moisture and carbon dioxide in the atmosphere can be suppressed during the heat treatment, thereby it becomes easy to adjust the above-described [conditions] and the pore specific volume within the range of the present invention.

<Lithium Secondary Battery>

Next, a positive electrode using the positive electrode active material for a secondary battery of the present embodiment and a lithium secondary battery including the positive electrode will be described while describing the configuration of a lithium secondary battery.

An example of the lithium secondary battery of the present embodiment includes a positive electrode, a negative electrode, a separator interposed between the positive electrode and the negative electrode, and an electrolytic solution disposed between the positive electrode and the negative electrode.

Figure 1B:
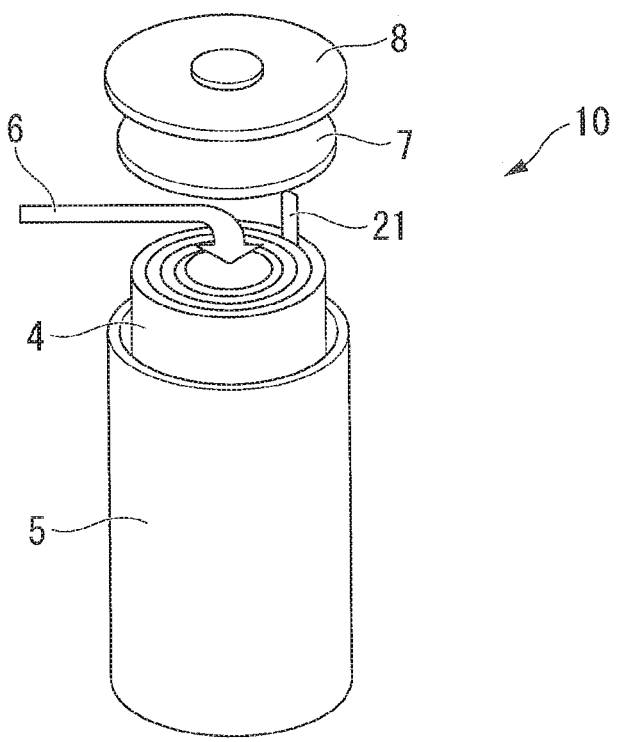
FIG. 1B is a schematic configuration view illustrating an example of the lithium-ion secondary battery.

FIGS. 1A and 1B are schematic views illustrating an example of the lithium secondary battery of the present embodiment. A cylindrical lithium secondary battery 10 of the present embodiment is manufactured as follows.

First, as illustrated in FIG. 1A, a pair of separators 1 having a strip shape, a strip-shaped positive electrode 2 having a positive electrode lead 21 at one end, and a strip-like negative electrode 3 having a negative electrode lead 31 at one end are stacked in order of the separator 1, the positive electrode 2, the separator 1, and the negative electrode 3 and are wound to form an electrode group 4.

Next, as shown in FIG. 1B, the electrode group 4 and an insulator (not illustrated) are accommodated in a cell can 5, the can bottom is then sealed, the electrode group 4 is impregnated with an electrolytic solution 6, and an electrolyte is disposed between the positive electrode 2 and the negative electrode 3. Furthermore, the upper portion of the cell can 5 is sealed with a top insulator 7 and a sealing body 8, whereby the lithium secondary battery 10 can be manufactured.

The shape of the electrode group 4 is, for example, a columnar shape such that the cross-sectional shape when the electrode group 4 is cut in a direction perpendicular to the winding axis is a circle, an ellipse, a rectangle, or a rectangle with rounded corners.

In addition, as a shape of the lithium secondary battery having the electrode group 4, a shape defined by IEC60086 which is a standard for a cell defined by the International Electrotechnical Commission (IEC), or by JIS C 8500 can be adopted. For example, shapes such as a cylindrical shape and a square shape can be adopted.

Furthermore, the lithium secondary battery is not limited to the wound type configuration, and may have a stacked type configuration in which a stacked structure of a positive electrode, a separator, a negative electrode, and a separator is repeatedly stacked. An exemplary type of the stacked type lithium secondary battery is a so-called coin type cell, a button type cell, and a paper type (or sheet type) cell.

Hereinafter, each configuration will be described in order.

(Positive Electrode)

The positive electrode of the present embodiment can be manufactured by first adjusting a positive electrode mixture containing a positive electrode active material, a conductive material, and a binder, and causing a positive electrode current collector to hold the positive electrode mixture.

(Conductive Material)

A carbon material can be used as the conductive material included in the positive electrode of the present embodiment. As the carbon material, there are graphite powder, carbon black (for example, acetylene black), a fibrous carbon material, and the like. Since carbon black is fine particles and has a large surface area, the addition of a small amount of carbon black to the positive electrode mixture can increase the conductivity inside the positive electrode and improve the charge and discharge efficiency and output characteristics. However, when too much carbon black is added, both the binding force between the positive electrode mixture and the positive electrode current collector and the binding force inside the positive electrode mixture by the binder decrease, which causes an increase in internal resistance.

The proportion of the conductive material in the positive electrode mixture is preferably 5 parts by mass or more and 20 parts by mass or less with respect to 100 parts by mass of the positive electrode active material. In a case of using a fibrous carbon material such as graphitized carbon fiber or carbon nanotube as the conductive material, the proportion can be reduced.

(Binder)

A thermoplastic resin can be used as the binder included in the positive electrode of the present embodiment.

As the thermoplastic resin, fluorine resins such as polyvinylidene fluoride (hereinafter, sometimes referred to as PVdF), polytetrafluoroethylene (hereinafter, sometimes referred to as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene can be adopted.

These thermoplastic resins may be used as a mixture of two or more. By using a fluorine resin and a polyolefin resin as the binder and setting the ratio of the fluorine resin to the total positive electrode mixture to 1 mass % or more and 10 mass % or less and the ratio of the polyolefin resin to the total positive electrode mixture to 0.1 mass % or more and 2 mass % or less, a positive electrode mixture having both high adhesion to the positive electrode current collector and high bonding strength in the positive electrode mixture can be obtained.

(Positive Electrode Current Collector)

As the positive electrode current collector included in the positive electrode of the present embodiment, a strip-shaped member formed of a metal material such as Al, Ni, or stainless steel as the forming material can be used. Among these, from the viewpoint of easy processing and low cost, it is preferable to use Al as the forming material and process Al into a thin film.

As a method of causing the positive electrode current collector to hold the positive electrode mixture, a method of press-forming the positive electrode mixture on the positive electrode current collector can be adopted. In addition, the positive electrode mixture may be held on the positive electrode current collector by forming the positive electrode mixture into a paste using an organic solvent, applying the paste of the positive electrode mixture to at least one side of the positive electrode current collector, drying the paste, and pressing the paste to be fixed.

In a case of forming the positive electrode mixture into a paste, as the organic solvent which can be used, amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethylacetamide and N-methyl-2-pyrrolidone (hereinafter, sometimes referred to as NMP) can be adopted.

Examples of a method of applying the paste of the positive electrode mixture to the positive electrode current collector include a slit die coating method, a screen coating method, a curtain coating method, a knife coating method, a gravure coating method, and an electrostatic spraying method.

The positive electrode can be manufactured by the method mentioned above.

(Negative Electrode)

The negative electrode included in the lithium secondary battery of the present embodiment may be a negative electrode into and from which lithium ions are doped and dedoped at a potential lower than that of the positive electrode, and an electrode in which a negative electrode mixture containing a negative electrode active material is held by a negative electrode current collector, and an electrode formed of a negative electrode active material alone can be adopted.

(Negative Electrode Active Material)

As the negative electrode active material included in the negative electrode, materials that can be doped with or dedoped from lithium ions at a potential lower than that of the positive electrode, such as carbon materials, chalcogen compounds (oxides, sulfides, and the like), nitrides, metals, and alloys can be adopted.

As the carbon materials that can be used as the negative electrode active material, graphite such as natural graphite and artificial graphite, cokes, carbon black, pyrolytic carbons, carbon fibers, and an organic polymer compound calcined body can be adopted.

As the oxides that can be used as the negative electrode active material, oxides of silicon expressed by the formula $SiO_x$ (where, x is a positive real number) such as $SiO_2$ and SiO; oxides of titanium expressed by the formula $TiO_x$ (where x is a positive real number) such as $TiO_2$ and TiO; oxides of vanadium expressed by the formula $VO_x$ (where x is a positive real number) such as $V_2O_5$ and $VO_2$; oxides of iron expressed by the formula $FeO_x$ (where x is a positive real number) such as $Fe_3O_4$, $Fe_2O_3$, and FeO; oxides of tin expressed by the formula $SnO_x$ (where x is a positive real number) such as $SnO_2$ and SnO; oxides of tungsten expressed by a general formula $WO_x$ (where, x is a positive real number) such as $WO_3$ and $WO_2$; and composite metal oxides containing lithium and titanium or vanadium such as $Li_4Ti_5O_{12}$ and $LiVO_2$ can be adopted.

As the sulfides that can be used as the negative electrode active material, sulfides of titanium expressed by the formula $TiS_x$ (where, x is a positive real number) such as $Ti_2S_3$, $TiS_2$, and TiS; sulfides of vanadium expressed by the formula $VS_x$ (where x is a positive real number) such $V_3S_4$, VS and VS; sulfides of iron expressed by the formula $FeS_x$ (where x is a positive real number) such as $Fe_3S_4$, $FeS_2$, and FeS; sulfides of molybdenum expressed by the formula $MoS_x$ (where x is a positive real number) such as $Mo_2S_3$ and $MoS_2$; sulfides of tin expressed by the formula $SnS_x$ (where x is a positive real number) such as $SnS_2$ and SnS; sulfides of tungsten expressed by $WS_x$ (where x is a positive real number) such as $WS_2$; sulfides of antimony expressed by the formula $SbS_x$ (where x is a positive real number) such as $Sb_2S_3$; and sulfides of selenium expressed by the formula $SeS_x$ (where x is a positive real number) such as $Se_5S_3$, $SeS_2$, and SeS can be adopted.

As the nitrides that can be used as the negative electrode active material, lithium-containing nitrides such as $Li_3N$ and $Li_{3-x}A_xN$ (where A is either one or both of Ni and Co, and $0<x<3$ is satisfied) can be adopted.

These carbon materials, oxides, sulfides, and nitrides may be used singly or in combination of two or more kinds. In addition, these carbon materials, oxides, sulfides, and nitrides may be either crystalline or amorphous.

Moreover, as the metals that can be used as the negative electrode active material, lithium metal, silicon metal, tin metal, and the like can be adopted.

As the alloys that can be used as the negative electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$ can be adopted.

These metals and alloys are mainly used alone as an electrode after being processed into, for example, a foil shape.

Among the above-mentioned negative electrode active materials, the carbon material mainly including graphite such as natural graphite and artificial graphite is preferably used because the potential of the negative electrode hardly changes from the uncharged state to the fully charged state during charging (the potential flatness is good), the average discharge potential is low, and the capacity retention ratio during repeated charging and discharging is high (the cycle characteristics are good). The shape of the carbon material may be, for example, a flaky shape such as natural graphite, a spherical shape such as mesocarbon microbeads, a fibrous shape such as graphitized carbon fiber, or an aggregate of fine powder.

The negative electrode mixture described above may contain a binder as necessary. As the binder, a thermoplastic resin can be adopted, and specifically, PVdF, thermoplastic polyimide, carboxymethylcellulose, polyethylene, and polypropylene can be adopted.

(Negative Electrode Current Collector)

As the negative electrode current collector included in the negative electrode, a strip-shaped member formed of a metal material, such as Cu, Ni, and stainless steel, as the forming material can be adopted. Among these, it is preferable to use Cu as the forming material and process Cu into a thin film because Cu is less likely to form an alloy with lithium and can be easily processed.

As a method of causing the negative electrode current collector to hold the negative electrode mixture, similarly to the case of the positive electrode, a method using press-forming, or a method of forming the negative electrode mixture into a paste using a solvent or the like, applying the paste onto the negative electrode current collector, drying the paste, and pressing the paste to be compressed can be adopted.

(Separator)

As the separator included in the lithium secondary battery of the present embodiment, for example, a material having a form such as a porous film, non-woven fabric, or woven fabric made of a material such as a polyolefin resin such as polyethylene and polypropylene, a fluorine resin, and a nitrogen-containing aromatic polymer can be used. In addition, two or more of these materials may be used to form the separator, or these materials may be stacked to form the separator.

In the present embodiment, the air resistance of the separator according to the Gurley method defined by JIS P 8117 is preferably 50 sec/100 cc or more and 300 sec/100 cc or less, and more preferably 50 sec/100 cc or more and 200 sec/100 cc or less in order for the electrolyte to favorably permeate therethrough during cell use (during charging and discharging).

In addition, the porosity of the separator is preferably 30 vol % or more and 80 vol % or less, and more preferably 40 vol % or more and 70 vol % or less with respect to the volume of the separator. The separator may be a laminate of separators having different porosity.

(Electrolytic Solution)

The electrolytic solution included in the lithium secondary battery of the present embodiment contains an electrolyte and an organic solvent.

As the electrolyte contained in the electrolytic solution, lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB refers to bis(oxalato)borate), LiFSI (here, FSI refers to bis(fluorosulfonyl)imide), lower aliphatic carboxylic acid lithium compounds, and $LiAlCl_4$ can be adopted, and a mixture of two or more of these may be used. Among these, as the electrolyte, it is preferable to use at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine.

As the organic solvent included in the electrolytic solution, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile;

amides such as N,N-dimethylformamide and N,N-dimethylacetamide; carbamates such as 3-methyl-2-oxazolidone; and sulfur-containing compounds such as sulfolane, dimethyl sulfoxide, and 1,3-propanesultone, or those obtained by introducing a fluoro group into these organic solvents (those in which one or more of the hydrogen atoms of the organic solvent are substituted with a fluorine atom) can be used.

As the organic solvent, it is preferable to use a mixture of two or more thereof. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. An electrolytic solution using such a mixed solvent has many features such as a wide operating temperature range, being less likely to deteriorate even when charged and discharged at a high current rate, being less likely to deteriorate even during a long-term use, and being non-degradable even in a case where a graphite material such as natural graphite or artificial graphite is used as the negative electrode active material.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery. A mixed solvent containing ethers having a fluorine substituent, such as pentafluoropropyl methyl ether and 2,2,3,3-tetrafluoropropyl difluoromethyl ether and dimethyl carbonate is even more preferable because the capacity retention ratio is high even when charging or discharging is performed at a high current rate.

A solid electrolyte may be used instead of the electrolytic solution. As the solid electrolyte, for example, an organic polymer electrolyte such as a polyethylene oxide-based polymer compound, or a polymer compound containing at least one or more of a polyorganosiloxane chain or a polyoxyalkylene chain can be used. A so-called gel type in which a non-aqueous electrolyte is held in a polymer compound can also be used. Inorganic solid electrolytes containing sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ can be adopted, and a mixture or two or more thereof may be used. By using these solid electrolytes, the safety of the lithium secondary battery may be further enhanced.

In addition, in a case of using a solid electrolyte in the lithium secondary battery of the present embodiment, there may be cases where the solid electrolyte plays a role of the separator, and in such a case, the separator may not be required.

Since the positive electrode active material having the above-described configuration uses the positive electrode active material of the present embodiment described above, side reactions that occur inside the battery of the lithium secondary battery can be suppressed.

Moreover, since the positive electrode having the above-described configuration includes the above-described positive electrode active material for a lithium secondary battery according to the present embodiment, side reactions occurring inside the battery of the lithium secondary battery can be suppressed.

Furthermore, since the lithium secondary battery having the above-described configuration has the above-described positive electrode, it becomes a lithium secondary battery in which side reactions occurring inside the battery are suppressed with respect to the conventional art.

Another aspect of the present invention includes a positive electrode active material for a lithium secondary battery including secondary particles which are aggregates of primary particles that are capable of being doped and dedoped with lithium ions, in which the secondary particles have a total specific surface area of pores having a pore radius of 10 nm or more and 50 nm or less of 0.32 $m^2/g$ or more and 0.70 $m^2/g$ or less in the pore distribution measured by a mercury porosimetry method, a content of lithium carbonate contained in a residual alkali salt on a surface of the secondary particles measured by neutralization titration is 0.02% by mass or more and 0.20% by mass or less with respect to the total mass of the secondary particles, and a content of lithium hydroxide contained in the residual alkali salt on the surface of the secondary particles measured by neutralization titration is 0.03% by mass or more and 0.15% by mass or less with respect to the total mass of the secondary particles. A tap density of the positive electrode active material for a lithium secondary battery is 2.5 g/cc or more and 3.5 g/cc or less.

EXAMPLES

Next, the present invention will be described in more detail with reference to examples.

In the present examples, the evaluation of the positive electrode active material for a lithium secondary battery and the evaluation of production of the positive electrode and the lithium secondary battery were performed as follows.

<<Compositional Analysis of Positive Electrode Active Material for Lithium Secondary Battery>>

A compositional analysis of the lithium-containing metal composite oxide produced by a method described later was performed by using an inductively-coupled plasma emission analyzer (manufactured by SII Nano Technology Inc., SPS3000) after dissolving the obtained lithium-containing metal composite oxide powder in hydrochloric acid.

<<Measurement of Total Value of Pore Specific Surface Area and Pore Specific Volume by Mercury Porosimetry Method>>

As a pretreatment, the positive electrode active material for a lithium secondary battery was dried at 120° C. for 4 hours at constant temperature. Using Autopore III9420 (manufactured by Micromeritics Instruments Corporation), pore distribution measurement was performed under the following measurement conditions. The surface tension of mercury was 480 dynes/cm, and the contact angle between mercury and the sample was 140°.

Measurement Conditions

Measurement temperature: 25° C.

Measurement pressure: 1.07 psia to 59256.3 psia

In the pore distribution measured by the above method, the total value of specific surface areas of pores having a pore radius of 10 nm or more and 50 nm or less and the specific volume of pores having a pore radius of 50 nm or more and 200 nm or less were calculated.

<<Quantitative Determination of Residual Lithium Contained in Positive Electrode Active Material for Lithium Secondary Battery (Neutralization Titration)>>

20 g of a positive electrode active material for a lithium secondary battery and 100 g of pure water were added to a 100 ml beaker and stirred for 5 minutes.

After stirring, the positive electrode active material for a lithium secondary battery was filtered, 0.1 mol/L of hydrochloric acid was added dropwise to 60 g of the remaining filtrate, and the pH of the filtrate was measured with a pH meter.

When the titration amount of the hydrochloric acid at pH=8.3±0.1 is A ml, and the titration amount of the hydrochloric acid at pH=4.5±0.1 is B ml, the concentrations of lithium carbonate and lithium hydroxide remaining in the positive electrode active material for a lithium secondary battery were calculated according to the following formulas. In the following formulas, the molecular weights of lithium carbonate and lithium hydroxide were calculated based on each atomic weight as H; 1.000, Li; 6.941, C; 12, O; 16.

Lithium carbonate concentration (%)=0.1×(B−A)/1000×73.882/(20×60/100)×100

Lithium hydroxide concentration (%)=0.1×(2A−B)/1000×23.941/(20×60/100)×100

<<Measurement of Average Secondary Particle Diameter of Positive Electrode Active Material for Lithium Secondary Battery>>

For measurement of average particle diameter, a laser diffraction particle size distribution apparatus (LA-950, manufactured by Horiba, Ltd.) was used. 0.1 g of a positive electrode active material powder for a lithium secondary battery or a metal composite oxide powder was added into 50 ml of 0.2 mass % sodium hexametaphosphate aqueous solution to obtain a dispersion liquid in which the powder was dispersed. The particle size distribution of the obtained dispersion was measured to obtain a volume-based cumulative particle size distribution curve. In the obtained cumulative particle size distribution curve, a value of the particle diameter ($D_{50}$) at 50% cumulation viewed from the fine particle side was defined as the average secondary particle diameter of the positive electrode active material for the lithium secondary battery.

<<Measurement of Tap Density>>

A tap density was determined by the method described in JIS R 1628-1997. Specifically, a positive electrode active material for a lithium secondary battery, which is a measurement sample, was dropped into a 20 cm³ measurement container while passing through a sieve, and the container was filled with the measurement sample. The sample volume was read and calculated after covering with a lid and repeating tapping 200 times with a stroke length of 50 mm.

[Production of Lithium Secondary Battery]

Production of a Positive Electrode for Lithium Secondary Battery

A paste-like positive electrode mixture was prepared by adding the positive electrode-active material for a lithium secondary battery obtained by the production method described later, a conductive material (acetylene black), and a binder (PVdF) to achieve a composition of positive electrode-active material for a lithium secondary battery: conductive material:binder=92:5:3 (mass ratio) and performing kneading thereon. During the preparation of the positive electrode mixture, N-methyl-2-pyrrolidone was used as an organic solvent.

The obtained positive electrode mixture was applied to Al foil serving as a current collector and having a thickness of 40 μm, and vacuum drying was performed at 150° C. for 8 hours to obtain a positive electrode for a lithium secondary battery. The electrode area of the positive electrode for a lithium secondary battery was 1.65 cm².

Production of Lithium Secondary Battery (Coin-Type Cell)

The following operation was performed in a glove box in a dry air atmosphere.

The positive electrode produced in "Production of a positive electrode for lithium secondary battery" was placed on the lower lid of a part for coin type cell R2032 (manufactured by Hohsen Corp.) with the aluminum foil surface facing downward, and a laminated film separator (a heat-resistant porous layer (thickness 16 μm) was laminated on a polyethylene porous film) was placed thereon. 300 μl of the electrolytic solution was injected thereinto. As the electrolytic solution, an electrolytic solution obtained by dissolving, in a mixed solution of ethylene carbonate, dimethyl carbonate, and ethyl methyl carbonate in a ratio of 30:35:35 (volume ratio), $LiPF_6$ to achieve 1.0 mol/L was used.

Next, metal lithium was used as the negative electrode, and the negative electrode was placed on the upper side of the laminated film separator, covered with the upper lid via a gasket, and caulked by a caulking machine, whereby a lithium secondary battery (coin type half cell R2032, hereinafter, sometimes referred to as "coin-type battery") was manufactured.

[Measurement of Float Electric Quantity]

Each battery obtained above was tested as follows. That is, the battery was charged at a constant current and a constant voltage at a test temperature of 60° C. with a charging maximum voltage of 4.3 V, a charging time of 60 hours, and a charging current of 0.05 CA. In the constant current/constant voltage charging, the integrated electricity quantity for 30 hours after the transition to the 4.3V constant voltage mode was calculated as the float electricity quantity (mAh/g).

Example 1

1. Production of Positive Electrode Active Material for Lithium Secondary Battery After water was put in a reaction tank equipped with a stirrer and an overflow pipe, an aqueous solution of sodium hydroxide was added thereto, and the liquid was maintained at a temperature of 55° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 90:7:2, whereby a mixed raw material solution was prepared.

Next, this mixed raw material solution, an aluminum sulfate aqueous solution in which an aluminum concentration is 7.2 wt %, and an ammonium sulfate aqueous solution as a complexing agent were continuously added to the reaction tank under stirring. The flow rate of the aluminum sulfate aqueous solution was such that the atomic ratio of nickel atoms, cobalt atoms, manganese atoms, and aluminum atoms was 90:7:2:1.

Additionally, nitrogen gas was continuously flowed. A sodium hydroxide aqueous solution was appropriately added dropwise so that the pH of the solution in the reaction tank became 11.6 to obtain nickel cobalt manganese aluminum composite hydroxide particles, washed with a sodium hydroxide solution, thereafter dehydrated by centrifugation, isolated, and dried at 105° C., whereby a nickel cobalt manganese aluminum composite hydroxide 1 was obtained.

The nickel cobalt manganese aluminum composite hydroxide 1 obtained as described above and lithium hydroxide powder were weighed to achieve Li/(Ni+Co+Mn+Al)=1.07 (molar ratio) and mixed. Thereafter, the mixture was calcined at 600° C. for 5 hours in an oxygen atmosphere, pulverized, calcined at 750° C. for 10 hours, whereby a lithium nickel cobalt manganese aluminum composite oxide 1 was obtained.

The obtained lithium nickel cobalt manganese aluminum composite oxide 1 was immersed in water, filtered, and then vacuum dried at 105° C. for 20 hours to obtain the target positive electrode active material 1 for a lithium secondary battery.

2. Evaluation of Positive Electrode Active Material for Lithium Secondary Battery Compositional analysis of the obtained positive electrode active material 1 for a lithium secondary battery was performed, and when the composition was made to correspond to the Composition formula (I), x=−0.003, y=0.072, z=0.024, w=0.111.

Table 1 shows the total value of the pore specific surface area, the residual lithium amount, the tap density, the particle size, the pore specific volume, and the float electricity quantity of the positive electrode active material for the lithium secondary battery of Example 1.

Example 2

1. Production of Positive Electrode Active Material for Lithium Secondary Battery After water was put in a reaction tank equipped with a stirrer and an overflow pipe, an aqueous solution of sodium hydroxide was added thereto, and the liquid was maintained at a temperature of 60° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 90:7:2, whereby a mixed raw material solution was prepared.

Next, this mixed raw material solution, an aluminum sulfate aqueous solution in which an aluminum concentration is 7.2 wt %, and an ammonium sulfate aqueous solution as a complexing agent were continuously added to the reaction tank under stirring. The flow rate of the aluminum sulfate aqueous solution was such that the atomic ratio of nickel atoms, cobalt atoms, manganese atoms, and aluminum atoms was 90:7:2:1. A mixed gas of nitrogen gas and air was continuously flowed such that the oxygen concentration in the tank (vol %) with respect to the flow rate of the manganese solution (mol/hr.) in the mixed raw material solution in the reaction tank became 0.178 (%·hr./mol). A sodium hydroxide aqueous solution was appropriately added dropwise so that the pH of the solution in the reaction tank became 11.4 to obtain nickel cobalt manganese aluminum composite hydroxide particles, washed with a sodium hydroxide solution, thereafter dehydrated by centrifugation, isolated, and dried at 105° C., whereby a nickel cobalt manganese aluminum composite hydroxide 2 was obtained. The obtained nickel cobalt manganese aluminum composite hydroxide 2 was calcined at 650° C. for 5 hours, whereby a nickel cobalt manganese aluminum composite oxide 2 was obtained.

The nickel cobalt manganese aluminum composite oxide 2 obtained as described above and the lithium hydroxide powder were weighed to achieve Li/(Ni+Co+Mn+Al)=1.13 (molar ratio) and mixed. And then, the mixture was calcined at 750° C. for 5 hours in an oxygen atmosphere, whereby a lithium nickel cobalt manganese aluminum composite oxide 2 was obtained.

The obtained lithium nickel cobalt manganese aluminum composite oxide 2 was immersed in 1 wt % of ammonia water, filtered, and then calcined at 700° C. for 5 hours in an oxygen atmosphere to obtain the desired positive electrode active material 2 for a lithium secondary battery was obtained.

2. Evaluation of Positive Electrode Active Material for Lithium Secondary Battery Compositional analysis of the obtained positive electrode active material for a lithium secondary battery was performed, and when the composition was made to correspond to the Composition formula (I), x=0.004, y=0.071, z=0.021 and w=0.011.

Table 1 shows the total value of the pore specific surface area, the residual lithium amount, the tap density, the particle size, the pore specific volume, and the float electricity quantity of the positive electrode active material for the lithium secondary battery of Example 2.

Comparative Example 1

1. Production of Positive Electrode Active Material for Lithium Secondary Battery After water was put in a reaction tank equipped with a stirrer and an overflow pipe, an aqueous solution of sodium hydroxide was added thereto, and the liquid was maintained at a temperature of 55° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 90:7:2, whereby a mixed raw material solution was prepared.

Next, this mixed raw material solution, an aluminum sulfate aqueous solution in which an aluminum concentration is 7.2 wt %, and an ammonium sulfate aqueous solution as a complexing agent were continuously added to the reaction tank under stirring. The flow rate of the aluminum sulfate aqueous solution was such that the atomic ratio of nickel atoms, cobalt atoms, manganese atoms, and aluminum atoms was 90:7:2:1. Additionally, nitrogen gas was continuously flowed. A sodium hydroxide aqueous solution was appropriately added dropwise so that the pH of the solution in the reaction tank became 11.7 to obtain nickel cobalt manganese aluminum composite hydroxide particles, washed with a sodium hydroxide solution, thereafter dehydrated by centrifugation, isolated, and dried at 105° C., whereby a nickel cobalt manganese aluminum composite hydroxide C1 was obtained.

The nickel cobalt manganese aluminum composite hydroxide C1 obtained as described above and lithium hydroxide powder were weighed to achieve Li/(Ni+Co+Mn+Al)=1.03 (molar ratio) and mixed. Thereafter, the mixture was calcined at 600° C. for 5 hours in an oxygen atmosphere, pulverized, and calcined at 750° C. for 10 hours, whereby the target positive electrode active material C1 was obtained.

2. Evaluation of Positive Electrode Active Material for Lithium Secondary Battery Compositional analysis of the obtained positive electrode active material for a lithium secondary battery was performed, and when the composition was made to correspond to the Composition formula (I), x=−0.009, y=0.071, z=0.020, w=0.009.

Table 1 shows the total value of the pore specific surface area, the residual lithium amount, the tap density, the particle size, the pore specific volume, and the float electricity quantity of the positive electrode active material for a lithium secondary battery of Comparative Example 1.

Example 3

1. Production of Positive Electrode Active Material for Lithium Secondary Battery After water was put in a reaction tank equipped with a stirrer and an overflow pipe, an aqueous solution of sodium hydroxide was added thereto, and the liquid was maintained at a temperature of 60° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 88:7:2, whereby a mixed raw material solution was prepared.

Next, this mixed raw material solution, an aluminum sulfate aqueous solution in which an aluminum concentration is 10.8 wt %, and an ammonium sulfate aqueous solution as a complexing agent were continuously added to the reaction tank under stirring. The flow rate of the aluminum sulfate aqueous solution was such that the atomic ratio of nickel atoms, cobalt atoms, manganese atoms, and aluminum atoms was 88:7:2:3. Additionally, nitrogen gas was continuously flowed. A sodium hydroxide aqueous solution was appropriately added dropwise so that the pH of the solution in the reaction tank became 11.8 to obtain nickel cobalt manganese aluminum composite hydroxide particles, washed with a sodium hydroxide solution, thereafter dehydrated by centrifugation, isolated, and dried at 105° C., whereby a nickel cobalt manganese aluminum composite hydroxide 3 was obtained. The obtained nickel cobalt manganese aluminum composite hydroxide 3 was calcined at 650° C. for 5 hours to obtain a nickel cobalt manganese aluminum composite oxide 3.

The nickel cobalt manganese aluminum composite hydroxide 3 obtained as described above and lithium hydroxide powder were weighed to achieve Li/(Ni+Co+Mn+Al)=1.13 (molar ratio) and mixed. Thereafter, the mixture was calcined at 750° C. for 5 hours in an oxygen atmosphere, whereby a lithium nickel cobalt manganese aluminum composite oxide 3 was obtained.

The obtained lithium nickel cobalt manganese aluminum composite oxide 3 was immersed in 1 wt % of ammonia water, filtered, and then vacuum dried at 150° C. for 24 hours to obtain the desired positive electrode active material 3 for a lithium secondary battery.

2. Evaluation of Positive Electrode Active Material for Lithium Secondary Battery Compositional analysis of the obtained positive electrode active material for a lithium secondary battery was performed, and when the composition was made to correspond to the Composition formula (I), $x=-0.002$, $y=0.070$, $z=0.021$, $w=0.030$.

Table 1 shows the total value of pore specific surface area, residual lithium amount, tap density, particle size, pore specific volume and float electric quantity of the positive electrode active material for lithium secondary battery of Example 3.

Example 4

1. Production of Positive Electrode Active Material for Lithium Secondary Battery The lithium nickel cobalt manganese aluminum composite oxide 3 described in Example 3 was immersed in 1 wt % of ammonia water, filtrated, and then calcined at 700° C. for 5 hours in an oxygen atmosphere to obtain the desired positive electrode active material 4 for a lithium secondary battery was obtained.

2. Evaluation of Positive Electrode Active Material for Lithium Secondary Battery Compositional analysis of the obtained positive electrode active material for a lithium secondary battery was performed, and when the composition was made to correspond to the Composition formula (I), $x=0.000$, $y=0.069$, $z=0.021$, $w=0.030$.

Table 1 shows the total value of the pore specific surface area, the residual lithium amount, the tap density, the particle size, the pore specific volume, and the float electricity amount of the positive electrode active material for the lithium secondary battery of Example 4.

Example 5

1. Production of Positive Electrode Active Material for Lithium Secondary Battery After water was put in a reaction tank equipped with a stirrer and an overflow pipe, an aqueous solution of sodium hydroxide was added thereto, and the liquid was maintained at a temperature of 60° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 85.5:9.5:2, whereby a mixed raw material solution was prepared.

Next, this mixed raw material solution, an aluminum sulfate aqueous solution in which an aluminum concentration is 10.8 wt %, and an ammonium sulfate aqueous solution as a complexing agent were continuously added to the reaction tank under stirring. The flow rate of the aluminum sulfate aqueous solution was such that the atomic ratio of nickel atoms, cobalt atoms, manganese atoms, and aluminum atoms was 85.5:9.5:2:3. Mixed gas of nitrogen and air is continuously aerated so that the ratio of the oxygen concentration in the reaction tank (volume %) with respect to the manganese solution flow rate in the mixed raw material solution in the in the tank (mol/hr.) is 0.390 (%·hr./mol). A sodium hydroxide aqueous solution was appropriately added dropwise so that the pH of the solution in the reaction tank became 12.1 to obtain nickel cobalt manganese aluminum composite hydroxide particles, washed with a sodium hydroxide solution, thereafter dehydrated by centrifugation, isolated, and dried at 105° C., whereby a nickel cobalt manganese aluminum composite hydroxide 5 was obtained. The obtained nickel cobalt manganese aluminum composite hydroxide 5 was calcined at 650° C. for 5 hours to obtain a nickel cobalt manganese aluminum composite oxide 5.

The nickel cobalt manganese aluminum composite hydroxide 5 obtained as described above and lithium hydroxide powder were weighed to achieve Li/(Ni+Co+Mn+Al)=1.00 (molar ratio) and mixed. Thereafter, the mixture was calcined at 770° C. for 5 hours in an oxygen atmosphere, whereby a lithium nickel cobalt manganese aluminum composite oxide 5 was obtained.

2. Evaluation of Positive Electrode Active Material for Lithium Secondary Battery Compositional analysis of the obtained positive electrode active material for a lithium secondary battery was performed, and when the composition was made to correspond to the Composition formula (I), $x=-0.002$, $y=0.095$, $z=0.020$, $w=0.026$.

Table 1 shows the total value of pore specific surface area, residual lithium amount, tap density, particle size, pore specific volume and float electric quantity of the positive electrode active material for the lithium secondary battery of Example 5.

Example 6

1. Production of Positive Electrode Active Material for Lithium Secondary Battery After water was put in a reaction tank equipped with a stirrer and an overflow pipe, an aqueous solution of sodium hydroxide was added thereto, and the liquid was maintained at a temperature of 38° C.

An aqueous solution of nickel sulfate and an aqueous solution of cobalt sulfate were mixed so that the atomic ratio of nickel atoms and cobalt atoms became 82:15, whereby a mixed raw material solution was prepared.

Next, this mixed raw material solution, an aluminum sulfate aqueous solution in which an aluminum concentration is 7.2 wt %, and an ammonium sulfate aqueous solution as a complexing agent were continuously added to the reaction tank under stirring. The flow rate of the aluminum sulfate aqueous solution was such that the atomic ratio of nickel atoms, cobalt atoms, and aluminum atoms was 82:15:3. Additionally, nitrogen gas was continuously flowed. A sodium hydroxide aqueous solution was appropriately added dropwise so that the pH of the solution in the reaction tank became 11.7 to obtain nickel cobalt aluminum composite hydroxide particles, washed with a sodium hydroxide solution, thereafter dehydrated by centrifugation, isolated, and dried at 300° C., whereby a nickel cobalt aluminum composite hydroxide 6 was obtained. The obtained nickel cobalt aluminum composite hydroxide 6 was calcined at 700° C. for 3 hours to obtain a nickel cobalt aluminum composite oxide 6.

The nickel cobalt aluminum composite oxide 6 obtained as described above and lithium hydroxide powder were weighed to achieve Li/(Ni+Co+Al)=1.15 (molar ratio) and mixed. Thereafter, the mixture was calcined at 720° C. for 10 hours in an oxygen atmosphere, whereby a lithium nickel cobalt aluminum composite oxide 6 was obtained.

The obtained lithium nickel cobalt aluminum composite oxide 6 was immersed in 15 wt % of lithium hydroxide aqueous solution, rinsed with pure water, filtrated, and then vacuum dried at 150° C. for 8 hours to obtain the desired positive electrode active material 6 for a lithium secondary battery.

2. Evaluation of Positive Electrode Active Material for Lithium Secondary Battery Compositional analysis of the obtained positive electrode active material for a lithium secondary battery was performed, and when the composition was made to correspond to the Composition formula (I), $x=0.016$, $y=0.145$, $z=0$ and $w=0.027$.

Table 1 shows the total value of the pore specific surface area, the residual lithium amount, the tap density, the particle size, the pore specific volume, and the float electricity quantity of the positive electrode active material for the lithium secondary battery of Example 6.

Example 7

The lithium nickel cobalt aluminum composite oxide 6 obtained in Example 6 was immersed in a 15 wt % of lithium hydroxide aqueous solution, rinsed with pure water, filtrated, and then vacuum dried at 80° C. for 15 hours to obtain the desired positive electrode active material 7 for a lithium secondary battery.

2. Evaluation of Positive Electrode Active Material for Lithium Secondary Battery Compositional analysis of the obtained positive electrode active material for a lithium secondary battery was performed, and when the composition was made to correspond to the Composition formula (I), $x=0.013$, $y=0.146$, $z=0$ and $w=0.028$.

Table 1 shows the total value of pore specific surface area, residual lithium amount, tap density, particle size, pore specific volume and float electric quantity of the positive electrode active material for lithium secondary battery of Example 7.

Comparative Example 2

A lithium hydroxide aqueous solution in which tungsten oxide was dissolved at 61 g/L was prepared. The prepared tungsten-dissolved lithium hydroxide aqueous solution was deposited on the nickel cobalt manganese aluminum composite oxide 5 so as to be W/(Ni+Co+Mn+Al+W)=0.005 (molar ratio) to obtain a nickel cobalt manganese aluminum tungsten composite oxide C2.

The nickel cobalt manganese aluminum tungsten composite oxide C2 obtained as described above and lithium hydroxide powder were weighed to achieve Li/(Ni+Co+Mn+Al+W)=1.00 (molar ratio) and mixed. Thereafter, the mixture was calcined at 770° C. for 5 hours in an oxygen atmosphere to obtain the desired positive electrode active material C2 for a lithium secondary battery.

2. Evaluation of Positive Electrode Active Material for Lithium Secondary Battery Compositional analysis of the obtained positive electrode active material for a lithium secondary battery was performed, and when the composition was made to correspond to the Composition formula (I), $x=-0.011$, $y=0.096$, $z=0.020$, $w=0.033$.

Table 1 shows the total pore specific surface area, residual lithium amount, tap density, particle size, pore specific volume and float electricity quantity of the positive electrode active material for lithium secondary battery of Comparative Example 2.

1. Production of Positive Electrode Active Material for Lithium Secondary Battery After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 51:22:27, whereby a mixed raw material solution was prepared.

Next, this mixed raw material solution and an ammonium sulfate aqueous solution as a complexing agent were continuously added to the reaction tank under stirring, and mixed gas of air and nitrogen is continuously flowed so that the ratio of the oxygen concentration in the reaction tank (volume %) with respect to the manganese solution flow rate (mol/hr.) in the mixed raw material solution in the in the tank is 1.29 (%·hr./mol) or less. A sodium hydroxide aqueous solution was appropriately added dropwise so that the pH of the solution in the reaction tank became 11.5 to obtain nickel cobalt manganese composite hydroxide particles, washed with a sodium hydroxide solution, thereafter dehydrated by centrifugation, isolated, and dried at 105° C., whereby a nickel cobalt manganese composite hydroxide 8 was obtained.

The nickel cobalt manganese composite hydroxide 8 obtained as described above and lithium hydroxide powder were weighed to achieve Li/(Ni+Co+Mn)=1.06 (molar ratio) and mixed. Thereafter, the mixture was calcined at 840° C. for 10 hours in an air atmosphere, whereby a desired positive electrode active material 8 for a lithium secondary battery was obtained.

2. Evaluation of Positive Electrode Active Material for Lithium Secondary Battery Compositional analysis of the obtained positive electrode active material for a lithium secondary battery was performed, and when the composition was made to correspond to the Composition formula (I), x=0.026, y=0.211, z=0.246 and w=0.

Table 1 shows the total value of the pore specific surface area, the residual lithium amount, the tap density, the particle size, the pore specific volume, and the float electricity amount of the positive electrode active material for the lithium secondary battery of Example 8.

Comparative Example 3

1. Production of Positive Electrode Active Material for Lithium Secondary Battery After water was put in a reaction tank equipped with a stirrer and an overflow pipe, an aqueous solution of sodium hydroxide was added thereto, and the liquid was maintained at a temperature of 30° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 58:17:25, whereby a mixed raw material solution was prepared.

Next, this mixed raw material solution and an ammonium sulfate aqueous solution as a complexing agent were continuously added to the reaction tank under stirring, and mixed gas of air and nitrogen is continuously flowed so that the ratio of the oxygen concentration in the reaction tank (volume %) with respect to the manganese solution flow rate (mol/hr.) in the mixed raw material solution in the in the tank is 1.39 (%·hr./mol). A sodium hydroxide aqueous solution was appropriately added dropwise so that the pH of the solution in the reaction tank became 12.4 to obtain nickel cobalt manganese composite hydroxide particles, washed with a sodium hydroxide solution, thereafter dehydrated by centrifugation, isolated, and dried at 105° C., whereby a nickel cobalt manganese composite hydroxide C3 was obtained. The obtained nickel cobalt manganese composite hydroxide C3 was calcined at 250° C. for 5 hours to obtain nickel cobalt manganese composite oxide C3.

The nickel cobalt manganese composite hydroxide C3 obtained as described above and lithium carbonate powder were weighed to achieve Li/(Ni+Co+Mn)=1.09 (molar ratio) and mixed. Thereafter, the mixture was calcined at 760° C. for 5 hours in an air atmosphere, pulverized, and then calcined at 850° C. for 10 hours, whereby a desired positive electrode active material C3 for a lithium secondary battery was obtained.

2. Evaluation of Positive Electrode Active Material for Lithium Secondary Battery Compositional analysis of the obtained positive electrode active material for a lithium secondary battery was performed, and when the composition was made to correspond to the Composition formula (I), x=0.042, y=0.156, z=0.227 and w=0.

Table 1 shows the total value of the pore specific surface area, the residual lithium amount, the tap density, the particle size, the pore specific volume, and the float electric quantity of the positive electrode active material for a lithium secondary battery of Comparative Example 3.

TABLE 1

| | Total value of the pore specific surface area ($m^2/g$) | x | y | z | w | Residual lithium (mass %) $Li_2CO_3$ | Residual lithium (mass %) LiOH | Tap density (g/cc) | Particle size (μm) | Pore specific volume ($cm^3/g$) | Float electric quantity (mAh/g) |
|---|---|---|---|---|---|---|---|---|---|---|---|
| Example 1 | 0.321 | −0.003 | 0.072 | 0.024 | 0.011 | 0.26 | 0.09 | 2.63 | 11.4 | 0.0005 | 9.1 |
| Example 2 | 0.427 | 0.004 | 0.071 | 0.021 | 0.011 | 0.07 | 0.23 | 2.17 | 12.5 | 0.0014 | 9.7 |
| Comparative Example 1 | 0.261 | −0.009 | 0.071 | 0.020 | 0.009 | 0.92 | 0.72 | 2.75 | 11.8 | 0.0006 | 24.9 |
| Example 3 | 0.412 | −0.002 | 0.070 | 0.021 | 0.030 | 0.05 | 0.07 | 2.58 | 10.4 | 0.0009 | 8.3 |
| Example 4 | 0.305 | 0.000 | 0.069 | 0.021 | 0.030 | 0.04 | 0.16 | 2.29 | 10.7 | 0.0011 | 9.4 |
| Example 5 | 0.776 | −0.002 | 0.095 | 0.020 | 0.026 | 0.13 | 0.44 | 2.31 | 11.6 | 0.0017 | 10.1 |
| Example 6 | 0.359 | 0.016 | 0.145 | 0 | 0.027 | 0.19 | 0.08 | 2.65 | 13.5 | 0.0009 | 5.6 |
| Example 7 | 0.388 | 0.013 | 0.146 | 0 | 0.028 | 0.11 | 0.07 | 2.66 | 13.5 | 0.0010 | 5.5 |
| Comparative Example 2 | 0.927 | −0.011 | 0.096 | 0.020 | 0.033 | 0.37 | 0.72 | 2.43 | 9.7 | 0.0095 | 13.6 |
| Example 8 | 0.701 | 0.026 | 0.211 | 0.246 | 0 | 0.18 | 0.22 | 1.97 | 6.0 | 0.0139 | 10.3 |
| Comparative Example 3 | 0.222 | 0.042 | 0.156 | 0.227 | 0 | 0.54 | 0.58 | 1.83 | 5.6 | 0.0005 | 11.8 |

As shown in the above results, in Examples 1 and 2 to which the present invention was applied, the float electric quantity was greatly reduced as compared with Comparative Example 1. The float electricity quantity of Examples 3 to 7 was reduced to 11 mAh/g or less compared to Comparative Example 2, and the float electricity quantity of Example 8 was reduced to 11 mAh/g or less compared to Comparative Example 3. On the other hand, all of Comparative Examples 1 to 3 had a float electric quantity larger than 11 mAh/g, and the float characteristics were poor.

Figure 2:
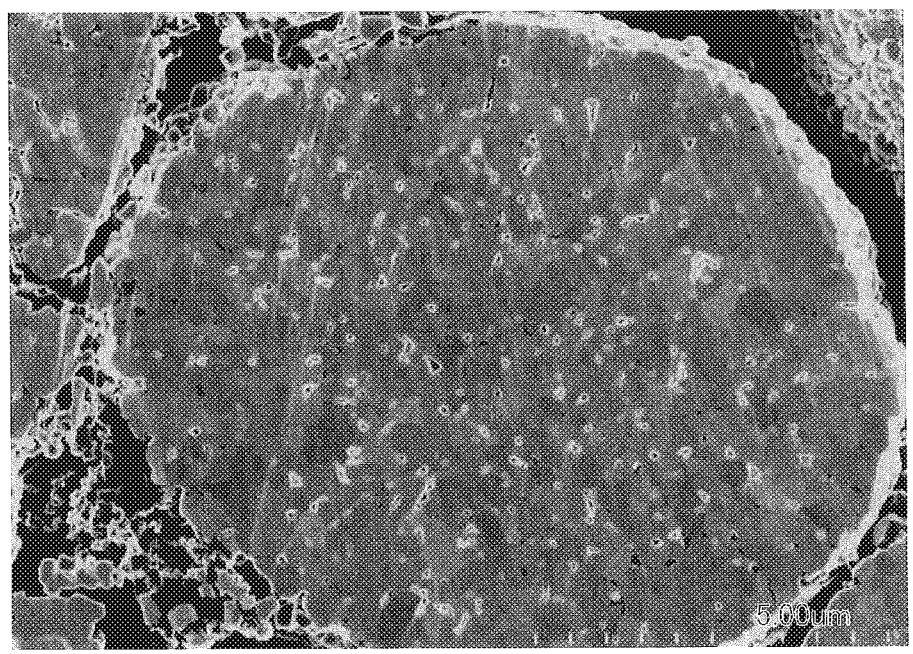
FIG. 2 is a cross-sectional SEM photograph of a positive electrode active material for a lithium secondary battery produced in Example 1.
Figure 3:
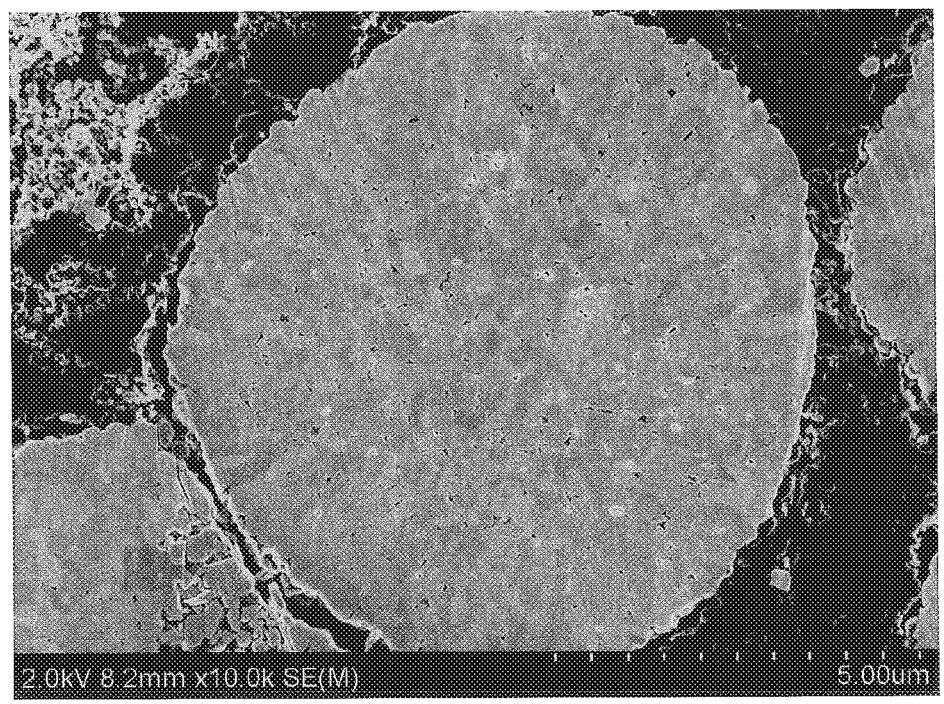
FIG. 3 is a cross-sectional SEM photograph of a positive electrode active material for a lithium secondary battery produced in Comparative Example 1.
Figure 4:
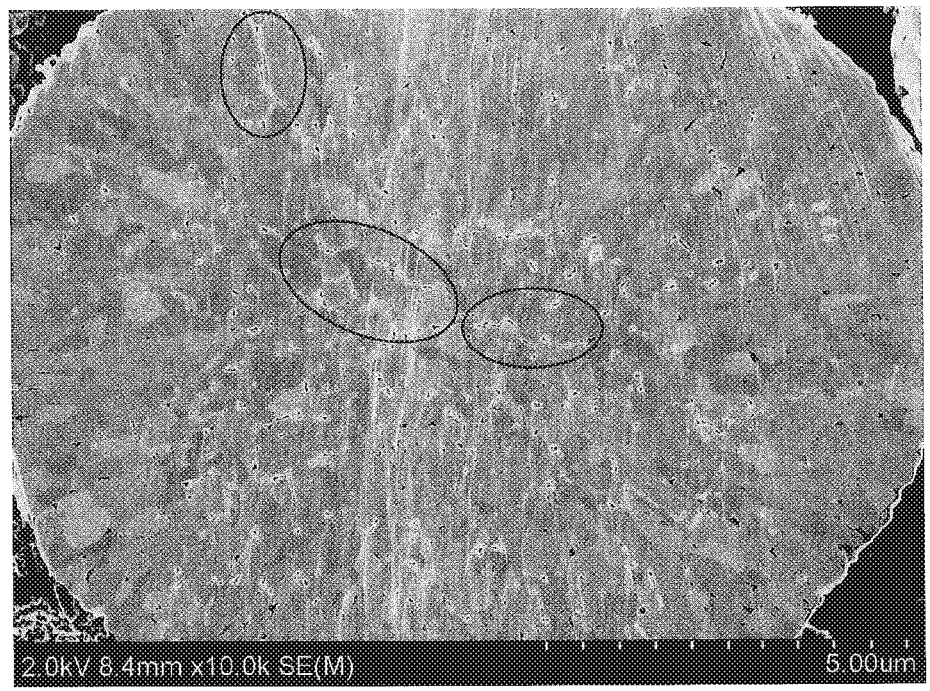
FIG. 4 is a cross-sectional SEM photograph after charge/discharge of a positive electrode active material for a lithium secondary battery produced in Comparative Example 1.

FIG. 2 shows a cross-sectional SEM photograph of the positive electrode active material for the lithium secondary battery produced in Example 1. The positive electrode active material for a lithium secondary battery of Example 1 to which the present invention was applied had fine pores inside the secondary particles. On the other hand, the positive electrode active material for a lithium secondary battery of Comparative Example 1 had almost no fine pores inside the secondary particles as shown in the SEM photograph shown in FIG. 3. FIG. 4 shows a cross-sectional SEM photograph after charge/discharge of the positive electrode active material for the lithium secondary battery produced in Comparative Example 1. In the SEM photograph of FIG. 4, cracks were confirmed. In FIG. 4, the white "streak" in the part surrounded by the ellipse is a crack.

INDUSTRIAL APPLICABILITY

According to this invention, the positive electrode active material for lithium secondary batteries which reduced especially the float electricity quantity among battery characteristics, the cathode using the positive electrode active material for lithium secondary batteries, and the secondary battery can be provided.

REFERENCE SIGNS LIST

1: separator, 2: positive electrode, 3: negative electrode, 4: electrode group, 5: battery can, 6: electrolytic solution, 7: top insulator, 8: sealing body, 10: lithium secondary battery, 21: positive electrode lead, 31: negative electrode lead

The invention claimed is:

1. A positive electrode active material for a lithium secondary battery comprising:
secondary particles which are aggregates of primary particles that are capable of being doped and dedoped with lithium ions, wherein
the secondary particles have a total specific surface area of pores having a pore radius of 10 nm or more and 50 nm or less of 0.27 m²/g or more and 0.90 m²/g or less in the pore distribution measured by a mercury porosimetry method.

2. The positive electrode active material for a lithium secondary battery according to claim 1, wherein
the secondary particles include a lithium-containing metal composite oxide whose compositional formula is represented by the following formula (I)

$$Li[Li_x(Ni_{(1-y-z-w)}Co_yMn_zM_w)_{1-x}]O_2 \quad (I)$$

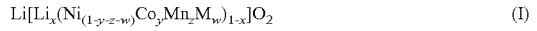

(in the formula (I), −0.1≤x≤0.2, 0<y≤0.4, 0≤z≤0.4, 0≤w≤0.1, M is one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

3. The positive electrode active material for a lithium secondary battery according to claim 2, wherein
a content of lithium carbonate contained in a residual alkali salt on a surface of the secondary particles measured by neutralization titration is 0.3% by mass or less with respect to the total mass of the secondary particles, and a content of lithium hydroxide contained in the residual alkali salt on the surface of the secondary particles measured by neutralization titration is 0.3% by mass or less with respect to the total mass of the secondary particles.

4. The positive electrode active material for a lithium secondary battery according to claim 2, wherein
a tap density is 2.3 g/cc or more.

5. The positive electrode active material for lithium secondary battery according to claim 2, wherein
an average secondary particle diameter is 5 µm or more and 20 µm or less.

6. The positive electrode active material for a lithium secondary battery according to claim 2, wherein, in the pore distribution measured by mercury porosimetry method, a pore specific volume of pores having a pore radius of 50 nm or more and 200 nm or less is 0.005 cm³/g or less.

7. The positive electrode active material for a lithium secondary battery according to claim 1, wherein
a content of lithium carbonate contained in a residual alkali salt on a surface of the secondary particles measured by neutralization titration is 0.3% by mass or less with respect to the total mass of the secondary particles, and a content of lithium hydroxide contained in the residual alkali salt on the surface of the secondary particles measured by neutralization titration is 0.3% by mass or less with respect to the total mass of the secondary particles.

8. The positive electrode active material for a lithium secondary battery according to claim 7, wherein
a tap density is 2.3 g/cc or more.

9. The positive electrode active material for lithium secondary battery according to claim 7, wherein
an average secondary particle diameter is 5 µm or more and 20 µm or less.

10. The positive electrode active material for a lithium secondary battery according to claim 7, wherein, in the pore distribution measured by mercury porosimetry method, a pore specific volume of pores having a pore radius of 50 nm or more and 200 nm or less is 0.005 cm³/g or less.

11. The positive electrode active material for a lithium secondary battery according to claim 1, wherein
a tap density is 2.3 g/cc or more.

12. The positive electrode active material for lithium secondary battery according to claim 11, wherein
an average secondary particle diameter is 5 µm or more and 20 µm or less.

13. The positive electrode active material for a lithium secondary battery according to claim 11, wherein, in the pore distribution measured by mercury porosimetry method, a pore specific volume of pores having a pore radius of 50 nm or more and 200 nm or less is 0.005 cm³/g or less.

14. The positive electrode active material for lithium secondary battery according to claim 1, wherein
an average secondary particle diameter is 5 µm or more and 20 µm or less.

15. The positive electrode active material for a lithium secondary battery according to claim 14, wherein, in the pore distribution measured by mercury porosimetry method, a pore specific volume of pores having a pore radius of 50 nm or more and 200 nm or less is 0.005 cm³/g or less.

16. The positive electrode active material for a lithium secondary battery according to claim 1, wherein, in the pore distribution measured by mercury porosimetry method, a pore specific volume of pores having a pore radius of 50 nm or more and 200 nm or less is 0.005 cm³/g or less.

17. A positive electrode for a lithium secondary battery including the positive electrode active material for a lithium secondary battery according to claim 1.

18. A lithium secondary battery including the positive electrode for a lithium secondary battery according to claim 17.

19. A positive electrode for a lithium secondary battery including the positive electrode active material for a lithium secondary battery according to claim 2.

20. A lithium secondary battery including the positive electrode for a lithium secondary battery according to claim 19.

* * * * *